United States Patent
Huang et al.

(10) Patent No.: US 9,507,124 B2
(45) Date of Patent: Nov. 29, 2016

(54) OPTICAL PHOTOGRAPHING LENS ASSEMBLY, IMAGING UNIT AND ELECTRONIC DEVICE

(71) Applicant: LARGAN PRECISION CO., LTD., Taichung (TW)

(72) Inventors: Hsin-Hsuan Huang, Taichung (TW); Chun-Che Hsueh, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 211 days.

(21) Appl. No.: 14/221,135

(22) Filed: Mar. 20, 2014

(65) Prior Publication Data
US 2015/0227021 A1    Aug. 13, 2015

(30) Foreign Application Priority Data

Feb. 11, 2014  (TW) .............................. 103104379 A

(51) Int. Cl.
G02B 9/34      (2006.01)
G02B 13/00     (2006.01)
G02B 9/58      (2006.01)

(52) U.S. Cl.
CPC .............. *G02B 13/004* (2013.01); *G02B 9/34* (2013.01); *G02B 9/58* (2013.01); *G02B 13/0015* (2013.01)

(58) Field of Classification Search
CPC ............ G02B 9/00; G02B 9/34; G02B 9/58; G02B 13/00; G02B 13/001; G02B 13/0015; G02B 13/002; G02B 13/004; G02B 13/008
See application file for complete search history.

(56) References Cited

U.S. PATENT DOCUMENTS

| 4,801,196 A | 1/1989 | Betensky |
| 8,274,593 B2 * | 9/2012 | Chen ................. G02B 13/004 348/335 |
| 2011/0157453 A1 * | 6/2011 | Chen ................. G02B 13/004 348/340 |
| 2012/0262804 A1 * | 10/2012 | Tang ................. G02B 13/004 359/717 |
| 2013/0278714 A1 | 10/2013 | Hirose |

FOREIGN PATENT DOCUMENTS

TW            201122614 A1    7/2011

* cited by examiner

*Primary Examiner* — Thong Nguyen
(74) *Attorney, Agent, or Firm* — Bruce Stone LLP; Joseph A. Bruce

(57) ABSTRACT

An optical photographing lens assembly includes, in order from an object side to an image side, a first lens element, a second lens element, a third lens element and a fourth lens element. The first lens element with negative refractive power has an image-side surface being concave in a paraxial region thereof. The second lens element with positive refractive power has an image-side surface being convex in a paraxial region thereof. The third lens element with positive refractive power has an image-side surface being convex in a paraxial region thereof, wherein both of an object-side surface and the image-side surface of the third lens element are aspheric. The fourth lens element has negative refractive power, wherein both of an object-side surface and an image-side surface of the fourth lens element are aspheric. The optical photographing lens assembly has a total of four non-cemented lens elements with refractive power.

14 Claims, 25 Drawing Sheets

OPTICAL PHOTOGRAPHING LENS ASSEMBLY, IMAGING UNIT AND ELECTRONIC DEVICE

RELATED APPLICATIONS

This application claims priority to Taiwan Application Serial Number 103104379, filed Feb. 11, 2014, which is incorporated by reference herein in its entirety.

BACKGROUND

1. Technical Field

The present disclosure relates to an optical photographing lens assembly, imaging unit and electronic device. More particularly, the present disclosure relates to a compact optical photographing lens assembly and imaging unit applicable to an electronic device.

2. Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact, optical systems have gradually evolved toward the field of higher megapixels, there is an increasing demand for compact optical systems featuring better image quality.

A conventional compact optical system in a portable electronic product typically utilizes a three-element lens structure. Due to the popularity of electronic products with high-end specifications, such as smart TVs, wireless monitoring devices, motion sensing input devices and other high-end electronic devices, the requirements for high resolution and image quality of present compact optical systems increase significantly. However, the conventional optical systems cannot satisfy these requirements of the compact optical systems.

Another conventional compact optical system provides a four-element lens structure. Since the first lens element has positive refractive power; therefore, it is not favorable for enlarging the field of view of the optical system. Furthermore, both of the second and the third lens elements have negative refractive powers, and the fourth lens element has positive refractive power. Therefore, it is not favorable for reducing the back focal length and keeping the optical system compact. Besides, the designs of the image-side surface of the first and the second lens elements result in worse image quality.

Inasmuch as the foregoing, a need exists in the art for having an optical system favorable for being applied to electronic products with large field of view and photographing functionality. In addition, it might be favorable for having good image quality and reducing the total track length of the optical system.

SUMMARY

According to one aspect of the present disclosure, an optical photographing lens assembly includes, in order from an object side to an image side, a first lens element, a second lens element, a third lens element and a fourth lens element. The first lens element with negative refractive power has an image-side surface being concave in a paraxial region thereof. The second lens element with positive refractive power has an image-side surface being convex in a paraxial region thereof. The third lens element with positive refractive power has an image-side surface being convex in a paraxial region thereof, wherein both of an object-side surface and the image-side surface of the third lens element are aspheric. The fourth lens element has negative refractive power, wherein both of an object-side surface and an image-side surface of the fourth lens element are aspheric. The optical photographing lens assembly has a total of four non-cemented lens elements with refractive power and further includes an aperture stop. At least one of the third lens element and the fourth lens element of the optical photographing lens assembly has at least one inflection point. When an axial distance between the first lens element and the second lens element is T12, an axial distance between the second lens element and the third lens element is T23, an axial distance between the third lens element and the fourth lens element is T34, a curvature radius of the object-side surface of the fourth lens element is R7, a curvature radius of the image-side surface of the fourth lens element is R8, an axial distance between an object-side surface of the first lens element and the image-side surface of the fourth lens element is TD, an axial distance between the aperture stop and the image-side surface of the fourth lens element is SD, an axial distance between the object-side surface of the first lens element and an image plane is TL, and a maximum image height of the optical photographing lens assembly is ImgH, the following conditions are satisfied:

$(T23+T34)/T12<0.70;$ $-1.8<(R7+R8)/(R7-R8);$ $0.45<SD/TD<0.90;$ and $TL/ImgH<4.0.$ According to another aspect of the present disclosure, an imaging unit includes the optical photographing lens assembly according to the aforementioned aspect and an image sensor, wherein the image sensor is disposed on an image side of the optical photographing lens assembly.

According to still another aspect of the present disclosure, an electronic device includes the imaging unit according to the aforementioned aspect.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
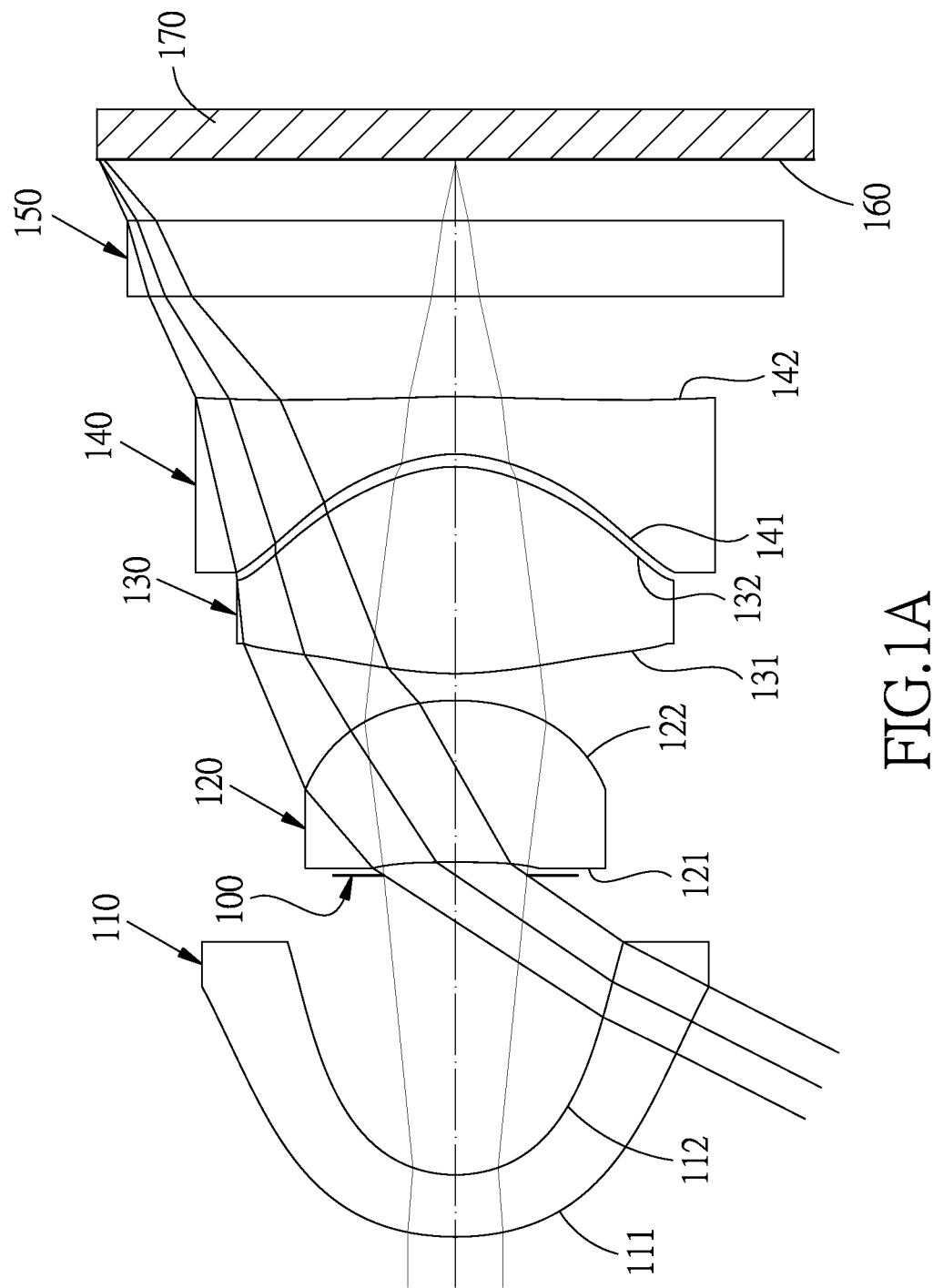
FIG. 1A is a schematic view of an imaging unit according to the 1st embodiment of the present disclosure.

An optical photographing lens assembly includes, in order from an object side to an image side, a first lens element, a second lens element, a third lens element and a fourth lens element. The optical photographing lens assembly has a total of four non-cemented lens elements with refractive power and further includes an aperture stop, wherein the aperture stop is disposed between the first lens element and the second lens element.

Each of the first through fourth lens elements is a single and non-cemented lens element. That is, any two lens elements adjacent to each other are not cemented, and there is a space between the two lens elements. Moreover, the manufacturing process of the cemented lenses is more complex than the non-cemented lenses. In particular, a second surface of one lens element and a first surface of the following lens element need to have accurate curvature to ensure these two lens elements will be highly cemented. However, during the cementing process, those two lens elements might not be highly cemented due to displacement, and it is thereby not favorable for the image quality of the optical photographing lens assembly. Therefore, the optical photographing lens assembly of the present disclosure provides four non-cemented lens elements for improving the problem generated by the cemented lens elements.

The first lens element with negative refractive power can have an object-side surface being convex in a paraxial region thereof and has an image-side surface being concave in a paraxial region thereof, so that it is favorable for enlarging the field of view and reducing astigmatism of the optical photographing lens assembly.

The second lens element with positive refractive power has an image-side surface being convex in a paraxial region thereof, so that it is favorable for correcting the aberration of the optical photographing lens assembly.

The third lens element with positive refractive power has an image-side surface being convex in a paraxial region thereof. Moreover, a curvature of the image-side surface of the third lens element is smaller in an off-axis region than a curvature of the image-side surface of the third lens element in a paraxial region. Therefore, it is favorable for reducing spherical aberration and further correcting the aberration of the off-axis.

The fourth lens element with negative refractive power can have an object-side surface being concave in a paraxial region thereof. Moreover, the image-side surface of the fourth lens element can either include a concave portion in a paraxial region and a convex portion in an off-axis region or include a convex portion in a paraxial region and a concave portion in an off-axis region. Therefore, it is favorable for reducing the incident angle of the light projecting onto an image sensor, so as to improve the responding efficiency of the image sensor and further correcting the aberration of the off-axis.

According to the optical photographing lens assembly of the present disclosure, at least one of the third lens element and the fourth lens element of the optical photographing lens assembly has at least one inflection point. Therefore, it is favorable for reducing the incident angle of the light projecting onto an image sensor, so as to improve the responding efficiency of the image sensor and further correcting the aberration of the off-axis.

According to the optical photographing lens assembly of the present disclosure, both of the second and the third lens elements have positive refractive power, and the fourth lens element has negative refractive power. Therefore, it is not favorable for reducing the back focal length and keeping the optical system compact. Moreover, the first lens element has an image-side surface being concave in a paraxial region thereof, together with the second lens element has an image-side surface being convex in a paraxial region thereof. Therefore, it is favorable for minimizing the incident angle of the peripheral region on the lens surface so as to reduce the aberration of the peripheral region and improve image quality.

When an axial distance between the first lens element and the second lens element is T12, an axial distance between the second lens element and the third lens element is T23, and an axial distance between the third lens element and the fourth lens element is T34, the following condition is satisfied: $(T23+T34)/T12<0.70$. Therefore, it favorable for properly adjusting the axial distances between every pair of lens elements so as to reduce the total track length of the optical photographing lens assembly and keep a compact size thereof. Preferably, the following condition is satisfied:

$(T23+T34)/T12<0.50$.

When a curvature radius of the object-side surface of the fourth lens element is R7, and a curvature radius of the image-side surface of the fourth lens element is R8, the following condition is satisfied: $-1.8<(R7+R8)/(R7-R8)$. Therefore, it is favorable for correcting the astigmatism of the optical photographing lens assembly. Preferably, the following condition is satisfied:

$$-1.6<(R7+R8)/(R7-R8)<0.8.$$

When an axial distance between the aperture stop and the image-side surface of the fourth lens element is SD, and an axial distance between the object-side surface of the first lens element and the image-side surface of the fourth lens element is TD, the following condition is satisfied: $0.45<SD/TD<0.90$. Therefore, it is favorable for making a balance between the telecentricity and wide-angle functionality so as to keep the optical photographing lens assembly compact.

When an axial distance between the object-side surface of the first lens element and an image plane is TL, and a maximum image height of the optical photographing lens assembly (half of a diagonal length of an effective photosensitive area of an image sensor) is ImgH, the following condition is satisfied: $TL/ImgH<4.0$. Therefore, it is favorable for keeping the optical photographing lens assembly compact.

According to the optical photographing lens assembly of the present disclosure, the aperture stop is disposed between the first lens element and the second lens element. Therefore, it is favorable for enlarging the field of view of the optical photographing lens assembly and thereby provides a wider field of view for the same. The aperture stop can also be disposed between an imaged object and the first lens element, which can provide a longer distance between an exit pupil of the optical photographing lens assembly and the image plane and thereby improves the image-sensing efficiency of an image sensor.

When a curvature radius of the object-side surface of the second lens element is R3, and a curvature radius of the image-side surface of the second lens element is R4, the following condition is satisfied: $0<(R3+R4)/(R3-R4)<2.0$. Therefore, the surface shape of the second lens element will be more proper and it is favorable for reducing the photosensitivity and the total track length of the optical photographing lens assembly.

When a curvature radius of the object-side surface of the third lens element is R5, and a curvature radius of the image-side surface of the third lens element is R6, the following condition is satisfied: $0<(R5+R6)/(R5-R6)<1.5$. Therefore, it is favorable for correcting the astigmatism of the optical photographing lens assembly.

When a refractive index of the first lens element is N1, a refractive index of the second lens element is N2, a refractive index of the third lens element is N3, and a refractive index of the fourth lens element is N4, the following condition is satisfied: $6.0<N1+N2+N3+N4<6.60$. Therefore, it is favorable for reducing the aberration of the optical photographing lens assembly so as to improve the image quality.

When the curvature radius of the image-side surface of the third lens element is R6, and the curvature radius of the object-side surface of the fourth lens element is R7, the following condition is satisfied: $-3.0<(R6+R7)/((R6-R7)*100)<2.0$. Therefore, it is favorable for correcting the aberration of the peripheral region and assembling the optical photographing lens assembly.

When a focal length of the second lens element is f2, and a focal length of the first lens element is f1, the following condition is satisfied: $-1.10<f2/f1<0$. Therefore, it is favorable for reducing the total track length of the optical photographing lens assembly so as to keep the optical photographing lens assembly compact.

When a central thickness of the second lens element is CT2, a central thickness of the third lens element is CT3, and a central thickness of the fourth lens element is CT4, the following condition is satisfied: $0<CT2/(CT3+CT4)<0.90$. Therefore, it is favorable for avoiding the lens elements with an excessively thin thickness or an excessively thick thickness and avoiding the lens elements being easily crackled or deformed during the manufacturing process. It is thereby favorable for assembling and arranging the lens elements of the optical photographing lens assembly.

When the focal length of the first lens element is f1, and a focal length of the fourth lens element is f4, the following condition is satisfied: $0.20<f4/f1<0.70$. Therefore, it is favorable for reducing the total track length of the optical photographing lens assembly so as keep it compact and reduce the photosensitivity thereof.

When an Abbe number of the first lens element is V1, and an Abbe number of the fourth lens element is V4, the following condition satisfied: $V1<35$; and $0<V1/V4<1.75$. Therefore, it is favorable for correcting the aberration of the optical photographing lens assembly.

When a distance in parallel with an optical axis from an axial vertex on the object-side surface of the first lens element to a maximum effective radius position on the object-side surface of the first lens element is SAG11 (when the aforementioned displacement towards the image side of the optical photographing lens assembly, SAG11 is positive; when the aforementioned displacement towards the object side thereof, SAG11 is negative), and a central thickness of the first lens element is CT1, the following condition is satisfied: $1.0<SAG11/CT1<4.5$. Therefore, the surface shape of the first lens element is not excessively curved, which is thereby favorable for manufacturing and molding the lens elements. It is also favorable for reducing the required space of assembly so as to keep the optical lens assembly more compact.

When the axial distance between the second lens element and the third lens element is T23, and the axial distance between the third lens element and the fourth lens element is T34, the following condition is satisfied: $0<T34/T23<0.7$. Therefore, it is favorable for assembling the lens elements of the optical photographing lens assembly so as to increase the manufacturing yield rate.

According to the optical photographing lens assembly of the present disclosure, the lens elements thereof can be made of glass or plastic material. When the lens elements are made of glass material, the distribution of the refractive power of the optical photographing lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the optical photographing lens assembly can also be reduced.

According to the optical photographing lens assembly of the present disclosure, the optical photographing lens assembly can include at least one stop, such as an aperture stop, a glare stop or a field stop. The glare stop or the field stop is for eliminating the stray light and thereby improving the image resolution thereof.

According to the optical photographing lens assembly of the present disclosure, each of an object-side surface in a paraxial region thereof and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

The present optical photographing lens assembly can be optionally applied to moving focus optical systems. According to the optical photographing lens assembly of the present disclosure, the optical photographing lens assembly is featured with good correction ability and high image quality, and can be applied to 3D (three-dimensional) image capturing applications, in products such as digital cameras, mobile devices, digital tablets, wearable devices and other electronic devices.

According to the present disclosure, an imaging unit is provided. The imaging unit includes the optical photographing lens assembly according to the aforementioned optical photographing lens assembly of the present disclosure, and an image sensor, wherein the image sensor is disposed on the image side of the aforementioned optical photographing lens assembly, that is, the image sensor can be disposed on or near an image plane of the aforementioned optical photographing lens assembly. It is thereby favorable for obtaining large field of view for the imaging unit and keeping a compact size thereof. Preferably, the imaging unit can further include a barrel member, a holding member or a combination thereof.

According to the present disclosure, an electronic device is provided, wherein the electronic device includes the aforementioned imaging unit. Preferably, the electronic device can further include but not limited to display, control unit, random access memory unit (RAM), storage unit or a combination thereof.

Figure 13:
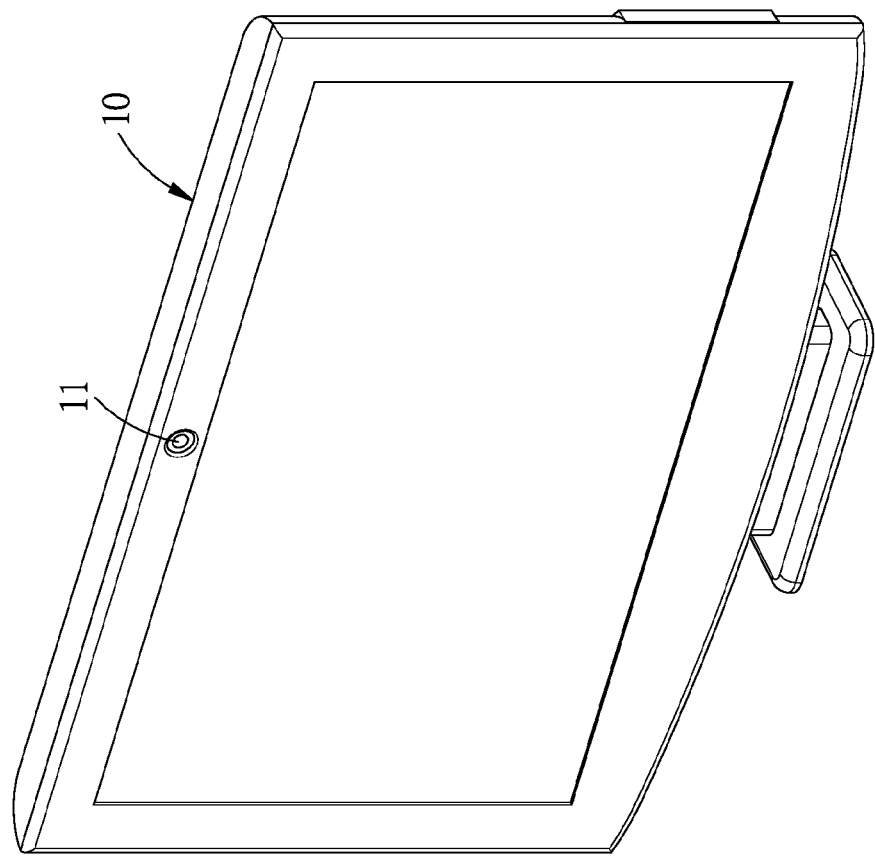
FIG. 13 shows an electronic device according to the 12th embodiment.
Figure 15:
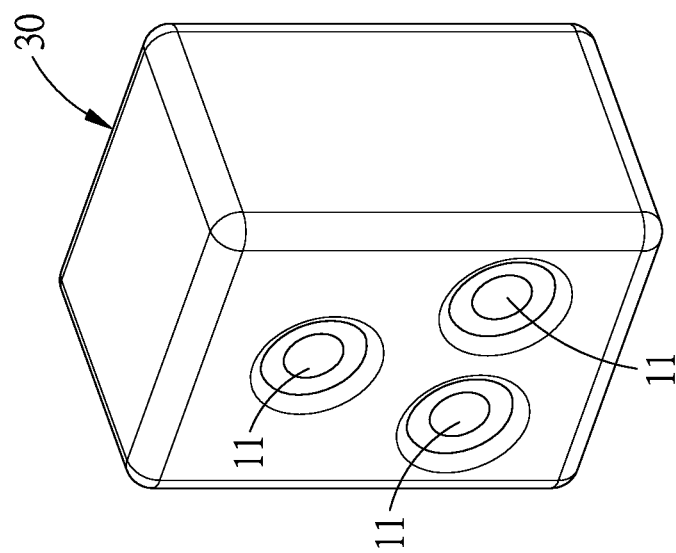
FIG. 15 shows an electronic device according to the 14th embodiment.
Figure 14:
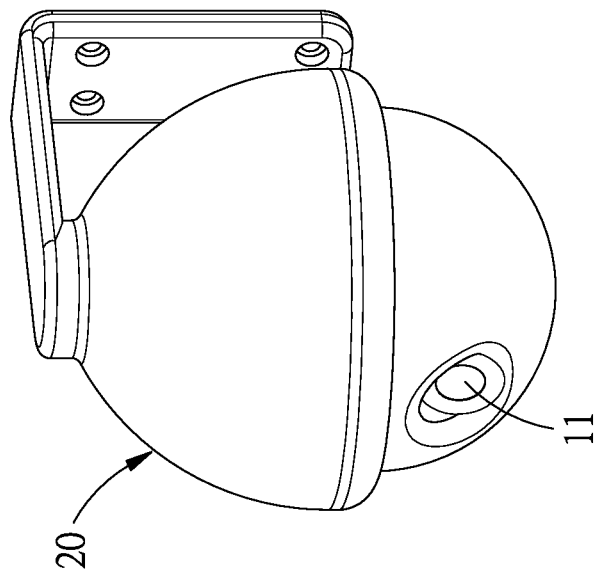
FIG. 14 shows an electronic device according to the 13th embodiment.

In FIG. 13, FIG. 14 and FIG. 15, an image unit 11 may be installed in, but not limited to, a smart TV 10 (FIG. 13), a wireless monitoring device 20 (FIG. 14) or a motion sensing input device 30 (FIG. 15). The three exemplary figures of different kinds of electronic devices are only exemplary for showing the imaging unit 11 of present disclosure installed in an electronic device and is not limited thereto.

According to the above description of the present disclosure, the following 1st-11th specific embodiments are provided for further explanation.

1st Embodiment

Figure 1B:
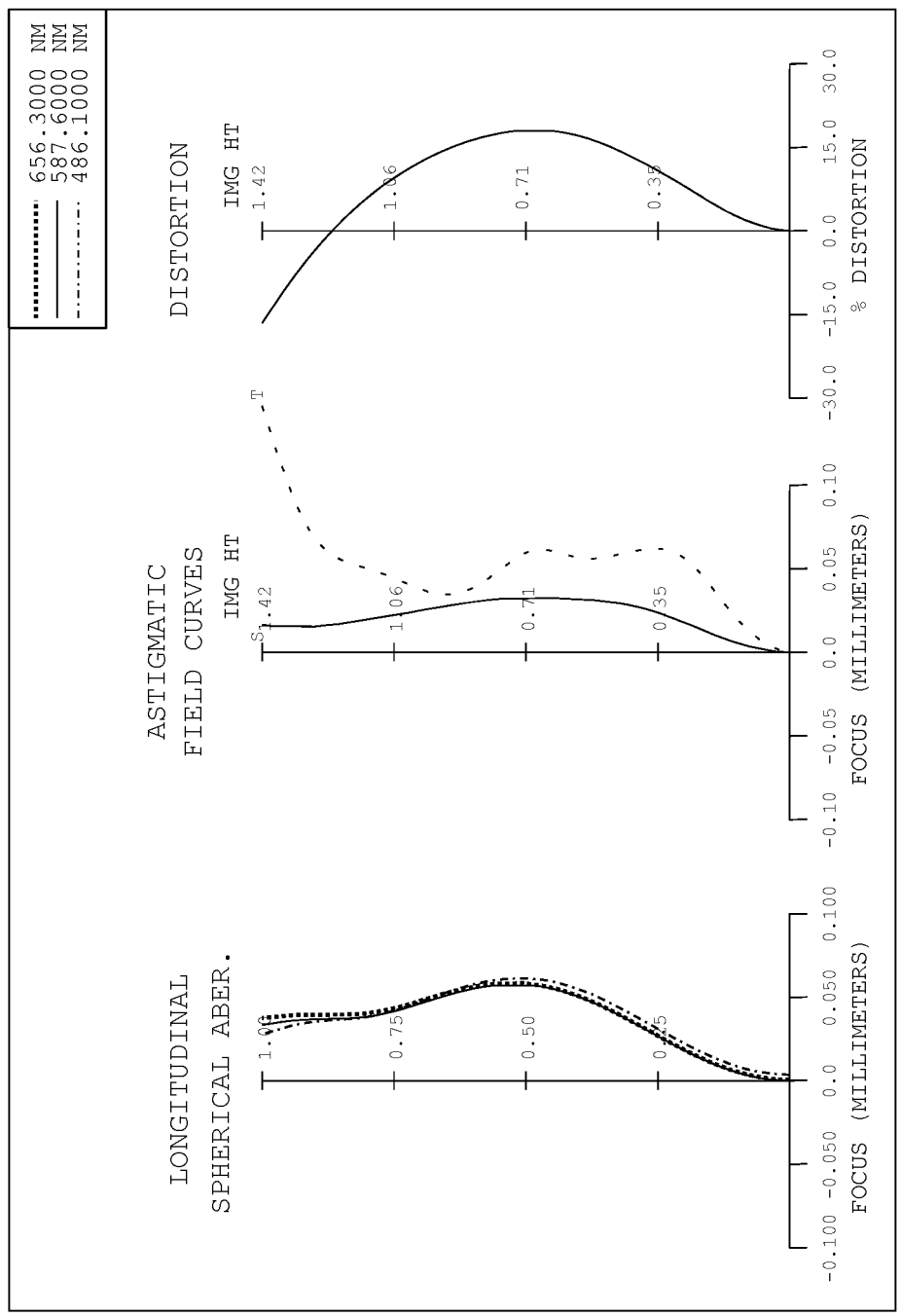
FIG. 1B shows spherical aberration curves, astigmatic field curves and a distortion curve of the imaging unit according to the 1st embodiment.

FIG. 1A is a schematic view of an imaging unit according to the 1st embodiment of the present disclosure. FIG. 1B shows, in order from left to right, spherical aberration curves, astigmatic field curves and a distortion curve of the imaging unit according to the 1st embodiment.

In FIG. 1A, the imaging unit includes the optical photographing lens assembly (not otherwise herein labeled) of the present disclosure and an image sensor 170. The optical photographing lens assembly includes, in order from an object side to an image side, a first lens element 110, an aperture stop 100, a second lens element 120, a third lens element 130, a fourth lens element 140, an IR-cut filter 150 and an image plane 160, wherein the optical photographing lens assembly has a total of four non-cemented lens elements (110-140) with refractive power.

The first lens element 110 with negative refractive power has an object-side surface 111 being convex in a paraxial region thereof and an image-side surface 112 being concave in a paraxial region thereof, which are both aspheric, and the first lens element 110 is made of plastic material.

The second lens element 120 with positive refractive power has an object-side surface 121 being concave in a paraxial region thereof and an image-side surface 122 being convex in a paraxial region thereof, which are both aspheric, and the second lens element 120 is made of plastic material.

The third lens element 130 with positive refractive power has an object-side surface 131 being convex in a paraxial region thereof and an image-side surface 132 being convex in a paraxial region thereof, which are both aspheric, and the third lens element 130 is made of plastic material. Moreover, a curvature of the image-side surface 132 of the third lens element 130 in an off-axis region thereof is smaller than a curvature of the image-side surface 132 of the third lens element 130 in the paraxial region.

The fourth lens element 140 with negative refractive power has an object-side surface 141 being concave in a paraxial region thereof and an image-side surface 142 being convex in a paraxial region thereof, which are both aspheric, and the fourth lens element 140 is made of plastic material. Furthermore, the image-side surface 142 of the fourth lens element 140 includes a concave portion in an off-axis region thereof.

The IR-cut filter 150 is made of glass and located between the fourth lens element 140 and the image plane 160, and will not affect the focal length of the optical photographing lens assembly. The image sensor 170 is disposed on or near the image plane 160 of the optical photographing lens assembly.

The equation of the aspheric surface profiles of the aforementioned lens elements of the 1st embodiment is expressed as follows:

$$X(Y) = (Y^2/R)/(1+sqrt(1-(1+k)\times(Y/R)^2)) + \sum_i (Ai)\times(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical photographing lens assembly of the imaging unit according to the 1st embodiment, when a focal length of the optical photographing lens assembly is f, an f-number of the optical photographing lens assembly is Fno, and half of a maximal field of view of the optical photographing lens assembly is HFOV, these parameters have the following values: f=0.85 mm; Fno=2.25; and HFOV=63.0 degrees.

In the optical photographing lens assembly of the imaging unit according to the 1st embodiment, when an axial distance between the first lens element 110 and the second lens element 120 is T12, an axial distance between the second lens element 120 and the third lens element 130 is T23, and an axial distance between the third lens element 130 and the fourth lens element 140 is T34, the following condition is satisfied:

(T23+T34)/T12=0.13.

In the optical photographing lens assembly according to the 1st embodiment, when a curvature radius of the object-side surface 141 of the fourth lens element 140 is R7, and a curvature radius of the image-side surface 142 of the fourth lens element 140 is R8, the following condition is satisfied:

(R7+R8)/(R7−R8)=−1.50.

In the optical photographing lens assembly according to the 1st embodiment, when an axial distance between an aperture stop 100 and the image-side surface 142 of the fourth lens element 140 is SD, and an axial distance between the object-side surface 111 of the first lens element 110 and the image-side surface 142 of the fourth lens element 140 is TD, the following condition is satisfied:

SD/TD=0.57.

In the optical photographing lens assembly according to the 1st embodiment, when an axial distance between the object-side surface 111 of the first lens element 110 and the image plane 160 is TL, and a maximum image height of the image capturing lens assembly (half of a diagonal length of an effective photosensitive area of an image sensor 170) is ImgH, the following condition is satisfied:

TL/ImgH=3.02.

In the optical photographing lens assembly according to the 1st embodiment, when a curvature radius of the object-side surface 121 of the second lens element 120 is R3, and a curvature radius of the image-side surface 122 of the second lens element 120 is R4, the following condition is satisfied:

(R3+R4)/(R3−R4)=1.38.

In the optical photographing lens assembly according to the 1st embodiment, when a curvature radius of the object-side surface 131 of the third lens element 130 is R5, and a curvature radius of the image-side surface 132 of the third lens element 130 is R6, the following condition is satisfied:

(R5+R6)/(R5−R6)=0.42.

In the optical photographing lens assembly according to the 1st embodiment, when a refractive index of the first lens element 110 is N1, a refractive index of the second lens element 120 is N2, a refractive index of the third lens element 130 is N3, and a refractive index of the fourth lens element 140 is N4, the following condition is satisfied:

N1+N2+N3+N4=6.36.

In the optical photographing lens assembly according to the 1st embodiment, when the curvature radius of the image-side surface 132 of the third lens element 130 is R6, and the curvature radius of the object-side surface 141 of the fourth lens element 140 is R7, the following condition is satisfied:

(R6+R7)/((R6−R7)*100)=−1.87.

In the optical photographing lens assembly according to the 1st embodiment, when a focal length of the second lens element 120 is f2, and a focal length of the first lens element 110 is f1, the following condition is satisfied:

f2/f1=−1.00.

In the optical photographing lens assembly according to the 1st embodiment, when a central thickness of the second lens element 120 CT2, a central thickness of the third lens element 130 is CT3, and a central thickness of the fourth lens element 140 is CT4, the following condition is satisfied:

CT2/(CT3+CT4)=0.61.

In the optical photographing lens assembly according to the 1st embodiment, when the focal length of the first lens element 110 is f1, and a focal length of the fourth lens element 140 is f4, the following condition is satisfied:

f4/f1=0.55.

In the optical photographing lens assembly according to the 1st embodiment, when an Abbe number of the first lens element 110 is V1, and an Abbe number of the fourth lens element 140 is V4, the following condition is satisfied:

V1=23.8; and V1/V4=1.11.

Figure 12:
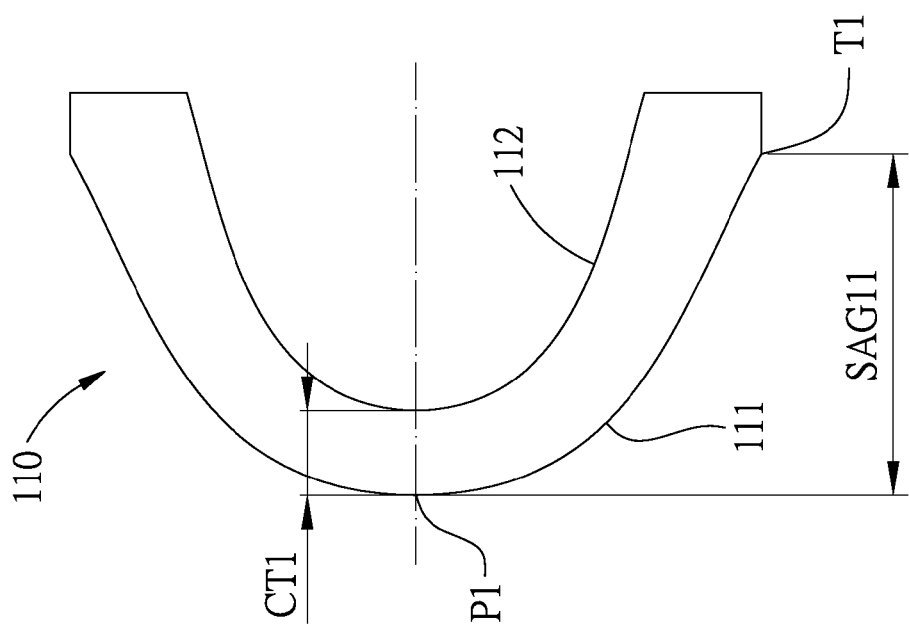
FIG. 12 shows SAG11 of the optical photographing lens assembly according to the 1st embodiment.

FIG. 12 shows SAG11 of the optical photographing lens assembly according to FIG. 1. In FIG. 12, when a distance in parallel with an optical axis from an axial vertex P1 on the object-side surface 111 of the first lens element 110 to a maximum effective radius position T1 on the object-side surface 111 of the first lens element 110 SAG11 (when the aforementioned displacement towards the image side of the optical photographing lens assembly, SAG11 is positive; when the aforementioned displacement towards the object side thereof, SAG11 is negative), and a central thickness of the first lens element 110 is CT1, the following condition is satisfied:

SAG11/CT1=4.04.

In the optical photographing lens assembly of the imaging unit according to the 1st embodiment, when the axial distance between the second lens element 120 and the third lens element 130 is T23, and the axial distance between the third lens element 130 and the fourth lens element 140 is T34, the following condition is satisfied:

T34/T23=0.47.

The detailed optical data of the 1st embodiment are shown in Table 1 and the aspheric surface data are shown in Table 2 below.

TABLE 1

1st Embodiment
f = 0.85 mm, Fno = 2.25, HFOV = 63.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.065 | ASP | 0.247 | Plastic | 1.634 | 23.8 | −2.07 |
| 2 | | 0.535 | ASP | 1.194 | | | | |
| 3 | Ape. Stop | Plano | | 0.052 | | | | |

TABLE 1-continued

1st Embodiment
f = 0.85 mm, Fno = 2.25, HFOV = 63.0 deg.

| Surface # | | Curvature Radius | Thickness | Material | Index | Abbe # | Focal Length |
|---|---|---|---|---|---|---|---|
| 4 | Lens 2 | −6.092 | ASP | 0.644 | Plastic | 1.535 | 55.7 | 2.08 |
| 5 | | −0.976 | ASP | 0.107 | | | | |
| 6 | Lens 3 | 1.372 | ASP | 0.824 | Plastic | 1.544 | 55.9 | 0.86 |
| 7 | | −0.564 | ASP | 0.050 | | | | |
| 8 | Lens 4 | −0.570 | ASP | 0.230 | Plastic | 1.650 | 21.4 | −1.14 |
| 9 | | −2.852 | ASP | 0.400 | | | | |
| 10 | IR-cut filter | Plano | | 0.300 | Glass | 1.517 | 64.2 | — |
| 11 | | Plano | | 0.245 | | | | |
| 12 | Image | Plano | | — | | | | |

Note:
Reference wavelength is 587.6 nm (d-line).

TABLE 2

Aspheric Coefficients

| Surface # | 1 | 2 | 4 | 5 |
|---|---|---|---|---|
| k = | −1.4845E+00 | −9.9885E−01 | 7.9773E+01 | 1.3726E+00 |
| A4 = | 1.0074E+00 | 2.0727E+00 | −1.6922E+00 | −7.8365E−01 |
| A6 = | −1.8002E+00 | −1.3835E+00 | 2.6749E+01 | 7.0355E−01 |
| A8 = | 4.2875E+00 | 3.8323E+00 | −3.4452E+02 | 2.0070E+00 |
| A10 = | −4.4294E+00 | 4.2981E+01 | 1.2102E+03 | −8.9681E+00 |
| A12 = | 1.4880E+00 | −8.7613E+01 | 6.2334E+02 | 3.9044E+00 |
| A14 = | | | −7.0874E+02 | −1.7012E+00 |

| Surface # | 6 | 7 | 8 | 9 |
|---|---|---|---|---|
| k = | −2.4414E+01 | −3.1902E+00 | −1.8898E+00 | −5.9992E+01 |
| A4 = | 5.5803E−02 | 1.8012E−01 | 1.5414E+00 | 9.3717E−01 |
| A6 = | −1.7182E−01 | −2.4332E+00 | −9.6590E+00 | −4.2170E+00 |
| A8 = | −5.1845E−01 | 5.3928E+00 | 2.3724E+01 | 1.0011E+01 |
| A10 = | 1.4041E+00 | −5.7500E+00 | −2.7607E+01 | −1.3746E+01 |
| A12 = | −9.1187E−01 | 2.9616E+00 | 1.1493E+01 | 1.1045E+01 |
| A14 = | 2.5721E−01 | −1.1138E−01 | 4.8096E+00 | −4.8460E+00 |
| A16 = | | | −4.2330E+00 | 9.0053E−01 |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 2A:
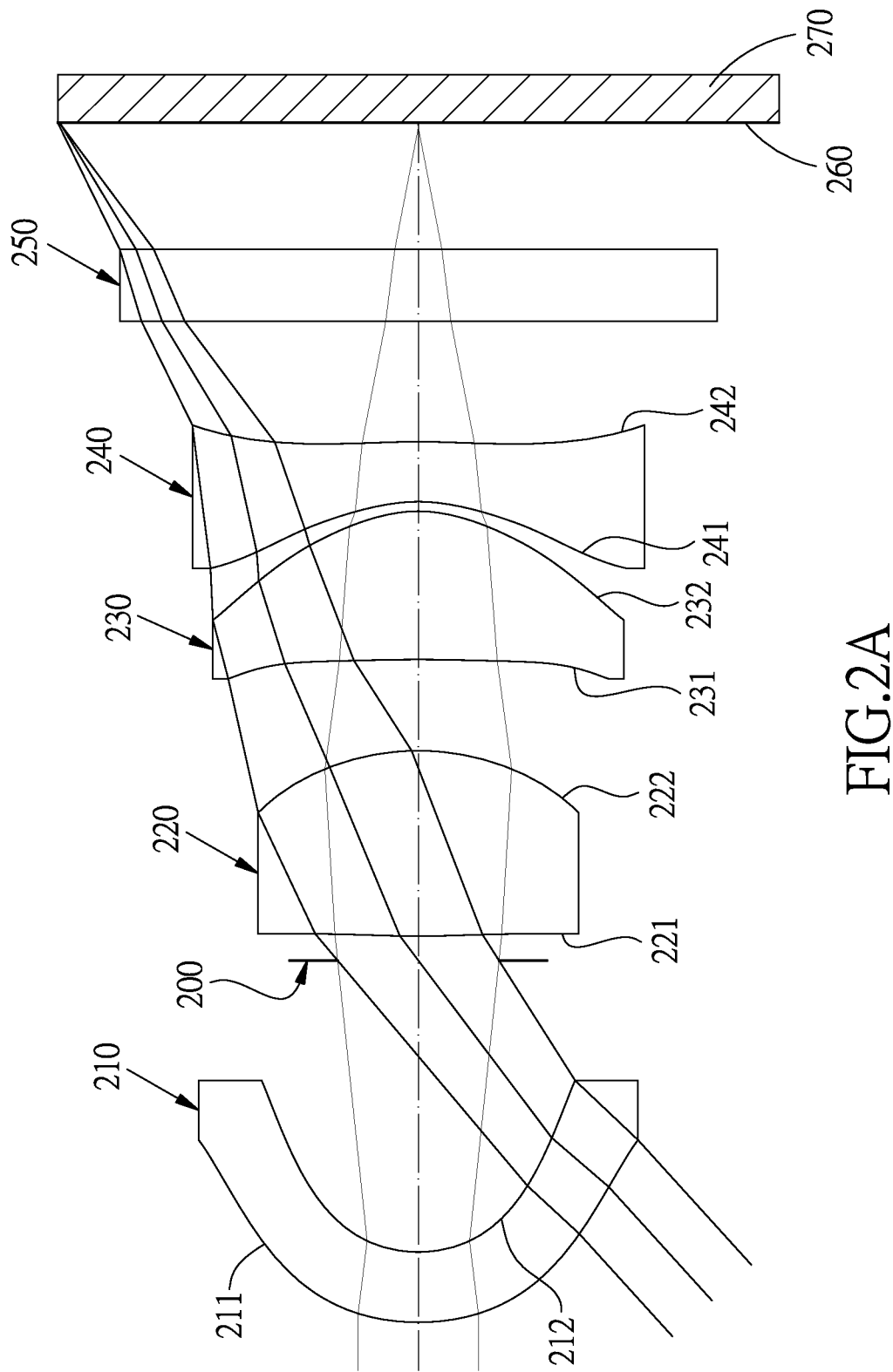
FIG. 2A is a schematic view of an imaging unit according to the 2nd embodiment of the present disclosure.
Figure 2B:
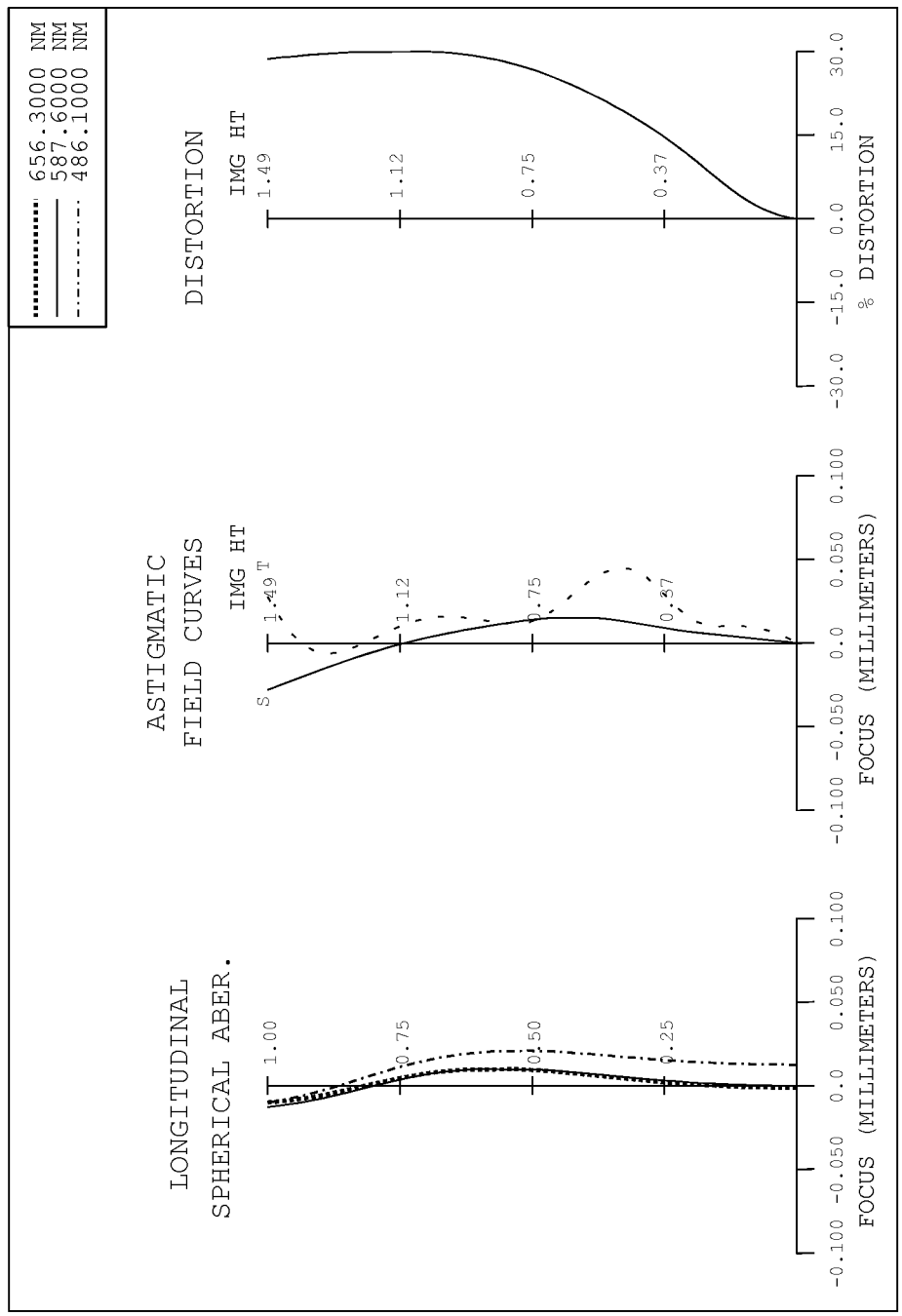
FIG. 2B shows spherical aberration curves, astigmatic field curves and a distortion curve of the imaging unit according to the 2nd embodiment.

FIG. 2A is a schematic view of an imaging unit according to the 2nd embodiment of the present disclosure. FIG. 2B shows, in order from left to right, spherical aberration curves, astigmatic field curves and a distortion curve of the imaging unit according to the 2nd embodiment.

In FIG. 2A, the imaging unit includes the optical photographing lens assembly (not otherwise herein labeled) of the present disclosure and an image sensor 270. The optical photographing lens assembly includes, in order from an object side to an image side, a first lens element 210, an aperture stop 200, a second lens element 220, a third lens element 230, a fourth lens element 240, an IR-cut filter 250 and an image plane 260, wherein the optical photographing lens assembly has a total of four non-cemented lens elements (210-240) with refractive power.

The first lens element 210 with negative refractive power has an object-side surface 211 being convex in a paraxial region thereof and an image-side surface 212 being concave in a paraxial region thereof, which are both aspheric, and the first lens element 210 is made of plastic material.

The second lens element 220 with positive refractive power has an object-side surface 221 being convex in a paraxial region thereof and an image-side surface 222 being convex in a paraxial region thereof, which are both aspheric, and the second lens element 220 is made of plastic material.

The third lens element 230 with positive refractive power has an object-side surface 231 being concave in a paraxial region thereof and an image-side surface 232 being convex in a paraxial region thereof, which are both aspheric, and the third lens element 230 is made of plastic material. Moreover, a curvature of the image-side surface 232 of the third lens element 230 in an off-axis region thereof is smaller than a curvature of the image-side surface 232 of the third lens element 230 in the paraxial region.

The fourth lens element 240 with negative refractive power has an object-side surface 241 being concave in a paraxial region thereof and an image-side surface 242 being convex in a paraxial region thereof, which are both aspheric, and the fourth lens element 240 is made of plastic material.

Furthermore, the image-side surface 242 of the fourth lens element 240 includes a concave portion in an off-axis region thereof.

The IR-cut filter 250 is made of glass and located between the fourth lens element 240 and the image plane 260, and will not affect the focal length of the optical photographing lens assembly. The image sensor 270 is disposed on or near the image plane 260 of the optical photographing lens assembly.

The detailed optical data of the 2nd embodiment are shown in Table 3 and the aspheric surface data are shown in Table 4 below.

| 2nd Embodiment | | | |
|---|---|---|---|
| f [mm] | 1.27 | (R5 + R6)/(R5 − R6) | 1.19 |
| Fno | 2.55 | (R7 + R8)/(R7 − R8) | −1.75 |
| HFOV [deg.] | 42.2 | (R6 + R7)/((R6 − R7)*100) | −0.11 |
| V1 | 21.4 | f2/f1 | −0.62 |
| V1/V4 | 1.00 | f4/f1 | 0.59 |
| CT2/(CT3 + CT4) | 0.89 | SD/TD | 0.59 |
| (T23 + T34)/T12 | 0.32 | SAG11/CT1 | 2.60 |
| T34/T23 | 0.11 | N1 + N2 + N3 + N4 | 6.39 |
| (R3 + R4)/(R3 − R4) | 0.69 | TL/ImgH | 3.35 |

TABLE 3

2nd Embodiment
f = 1.27 mm, Fno = 2.55, HFOV = 42.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 0.954 | ASP | 0.292 | Plastic | 1.650 | 21.4 | −2.60 |
| 2 | | 0.536 | ASP | 1.213 | | | | |
| 3 | Ape. Stop | Plano | | 0.102 | | | | |
| 4 | Lens 2 | 5.364 | ASP | 0.771 | Plastic | 1.544 | 55.9 | 1.61 |
| 5 | | −0.997 | ASP | 0.379 | | | | |
| 6 | Lens 3 | −6.459 | ASP | 0.617 | Plastic | 1.544 | 55.9 | 1.10 |
| 7 | | −0.567 | ASP | 0.040 | | | | |
| 8 | Lens 4 | −0.683 | ASP | 0.250 | Plastic | 1.650 | 21.4 | −1.53 |
| 9 | | −2.504 | ASP | 0.500 | | | | |
| 10 | IR-cut filter | Plano | | 0.300 | Glass | 1.517 | 64.2 | — |
| 11 | | Plano | | 0.526 | | | | |
| 12 | Image | Plano | | — | | | | |

Note:
Reference wavelength is 587.6 nm (d-line).

TABLE 4

| Aspheric Coefficients | | | | |
|---|---|---|---|---|
| Surface # | 1 | 2 | 4 | 5 |
| k = | −5.4246E−01 | −1.8620E+00 | −9.0000E+01 | 8.4771E−02 |
| A4 = | 8.5715E−01 | 2.6227E+00 | −5.0496E−02 | 2.2803E−01 |
| A6 = | −1.5032E+00 | −9.7628E−01 | −2.2520E+00 | −1.0440E+00 |
| A8 = | 3.5963E+00 | 2.1797E+00 | 2.6786E+01 | 2.6845E+00 |
| A10 = | −4.2170E+00 | 7.6503E+00 | −1.9477E+02 | −4.7526E+00 |
| A12 = | 1.4880E+00 | −2.9944E+01 | 6.2334E+02 | 3.9044E+00 |
| A14 = | | | −7.0874E+02 | −1.7012E+00 |
| Surface # | 6 | 7 | 8 | 9 |
| k = | 2.7137E+01 | −3.4607E+00 | −2.8494E+00 | −5.4707E+01 |
| A4 = | 2.9144E−01 | 1.8378E−01 | 1.6756E+00 | 1.0510E+00 |
| A6 = | −4.5978E−01 | −2.3176E+00 | −9.5182E+00 | −4.2039E+00 |
| A8 = | −1.3805E+00 | 5.3546E+00 | 2.3651E+01 | 1.0019E+01 |
| A10 = | 2.3994E+00 | −6.0026E+00 | −2.7554E+01 | −1.3815E+01 |
| A12 = | −9.1187E−01 | 2.9616E+00 | 1.1376E+01 | 1.1082E+01 |
| A14 = | 2.5721E−01 | −1.1138E−01 | 4.5134E+00 | −4.8026E+00 |
| A16 = | | | −4.0926E+00 | 8.5274E−01 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

3rd Embodiment

Figure 3A:
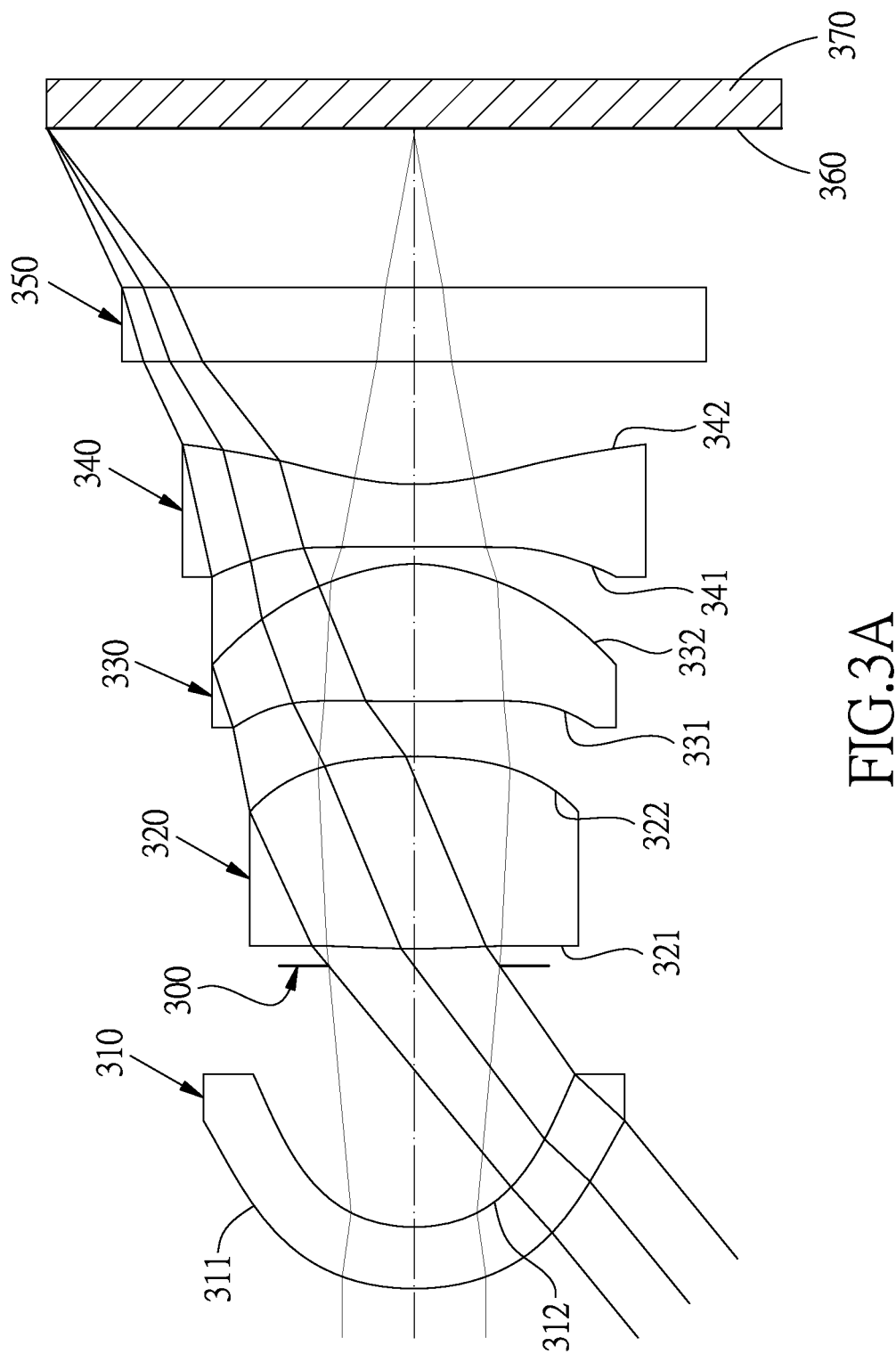
FIG. 3A is a schematic view of an imaging unit according to the 3rd embodiment of the present disclosure.
Figure 3B:
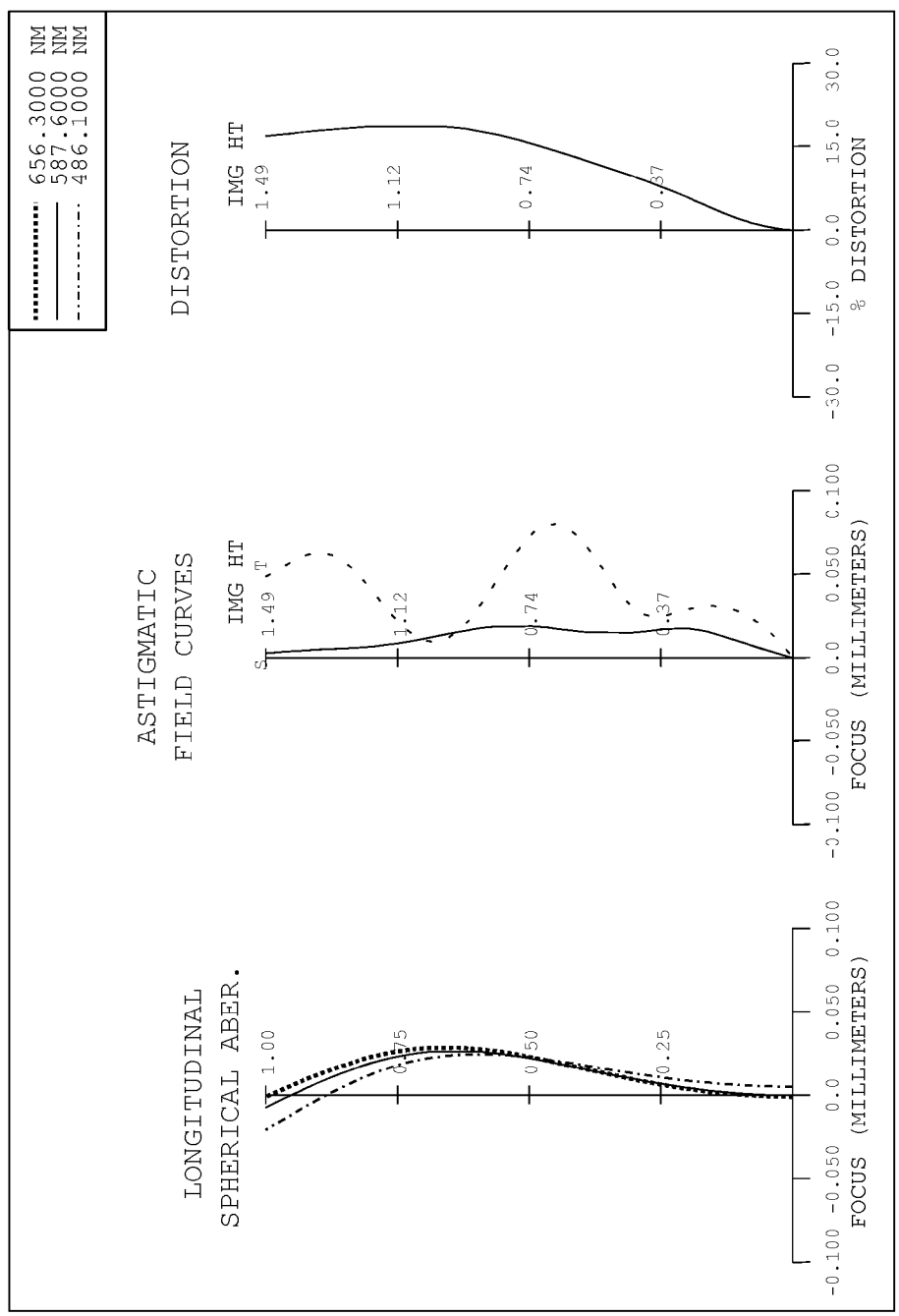
FIG. 3B shows spherical aberration curves, astigmatic field curves and a distortion curve of the imaging unit according to the 3rd embodiment.

FIG. 3A is a schematic view of an imaging unit according to the 3rd embodiment of the present disclosure. FIG. 3B shows, in order from left to right, spherical aberration curves, astigmatic field curves and a distortion curve of the imaging unit according to the 3rd embodiment.

In FIG. 3A, the imaging unit includes the optical photographing lens assembly (not otherwise herein labeled) of the present disclosure and an image sensor 370. The optical photographing lens assembly includes, in order from an object side to an image side, a first lens element 310, an aperture stop 300, a second lens element 320, a third lens element 330, a fourth lens element 340, an IR-cut filter 350 and an image plane 360, wherein the optical photographing lens assembly has a total of four non-cemented lens elements (310-340) with refractive power.

The first lens element 310 with negative refractive power has an object-side surface 311 being convex in a paraxial region thereof and an image-side surface 312 being concave in a paraxial region thereof, which are both aspheric, and the first lens element 310 is made of plastic material.

The second lens element 320 with positive refractive power has an object-side surface 321 being convex in a paraxial region thereof and an image-side surface 322 being convex in a paraxial region thereof, which are both aspheric, and the second lens element 320 is made of plastic material.

The third lens element 330 with positive refractive power has an object-side surface 331 being convex in a paraxial region thereof and an image-side surface 332 being convex in a paraxial region thereof, which are both aspheric, and the third lens element 330 is made of plastic material. Moreover, a curvature of the image-side surface 332 of the third lens element 330 in an off-axis region thereof is smaller than a curvature of the image-side surface 332 of the third lens element 330 in the paraxial region.

The fourth lens element 340 with negative refractive power has an object-side surface 341 being concave in a paraxial region thereof and an image-side surface 342 being concave in a paraxial region thereof, which are both aspheric, and the fourth lens element 340 is made of plastic material. Furthermore, the image-side surface 342 of the fourth lens element 340 includes a convex portion in an off-axis region thereof.

The IR-cut filter 350 is made of glass and located between the fourth lens element 340 and the image plane 360, and will not affect the focal length of the optical photographing lens assembly. The image sensor 370 is disposed on or near the image plane 360 of the optical photographing lens assembly.

The detailed optical data of the 3rd embodiment are shown in Table 5 and the aspheric surface data are shown in Table 6 below.

TABLE 5

3rd Embodiment
f = 1.55 mm, Fno = 2.65, HFOV = 39.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 0.986 | ASP | 0.250 | Plastic | 1.639 | 23.5 | −3.65 |
| 2 | | 0.625 | ASP | 1.064 | | | | |
| 3 | Ape. Stop | Plano | | 0.070 | | | | |
| 4 | Lens 2 | 3.844 | ASP | 0.783 | Plastic | 1.535 | 55.7 | 2.57 |
| 5 | | −1.989 | ASP | 0.224 | | | | |
| 6 | Lens 3 | 14.570 | ASP | 0.559 | Plastic | 1.535 | 55.7 | 1.19 |
| 7 | | −0.655 | ASP | 0.070 | | | | |
| 8 | Lens 4 | −7.216 | ASP | 0.255 | Plastic | 1.639 | 23.5 | −1.61 |
| 9 | | 1.216 | ASP | 0.500 | | | | |
| 10 | IR-cut filter | Plano | | 0.300 | Glass | 1.517 | 64.2 | — |
| 11 | | Plano | | 0.648 | | | | |
| 12 | Image | Plano | | — | | | | |

Note:
Reference wavelength is 587.6 nm (d-line).

TABLE 6

| Aspheric Coefficients | | | | |
|---|---|---|---|---|
| Surface # | 1 | 2 | 4 | 5 |
| k = | −5.5452E−01 | −1.8556E+00 | −5.2636E+01 | 5.3412E+00 |
| A4 = | 7.2576E−01 | 1.8134E+00 | −3.0813E−02 | −1.8162E−01 |
| A6 = | −1.0370E+00 | 3.6532E−01 | −3.6767E+00 | −1.3971E+00 |
| A8 = | 3.4316E+00 | 3.9634E+00 | 3.6259E+01 | 3.4270E+00 |
| A10 = | −4.3967E+00 | −7.8790E+00 | −2.1885E+02 | −4.5028E+00 |
| A12 = | 1.4880E+00 | −7.3464E+00 | 6.2334E+02 | 3.9044E+00 |
| A14 = | | | −7.0874E+02 | −1.7012E+00 |

| Surface # | 6 | 7 | 8 | 9 |
|---|---|---|---|---|
| k = | 4.2763E+01 | −6.6275E+00 | 6.8484E+01 | −8.8786E+00 |
| A4 = | 1.1845E−02 | −7.9599E−02 | 1.3700E+00 | 5.8125E−01 |
| A6 = | −1.1710E+00 | −2.0887E+00 | −9.5372E+00 | −3.8754E+00 |
| A8 = | −4.9107E−01 | 5.4114E+00 | 2.3837E+01 | 9.8604E+00 |
| A10 = | 2.5225E+00 | −6.2735E+00 | −2.7679E+01 | −1.3766E+01 |
| A12 = | −9.1187E−01 | 2.9616E+00 | 1.1376E+01 | 1.1082E+01 |
| A14 = | 2.5721E−01 | −1.1138E−01 | 4.5134E+00 | −4.8026E+00 |
| A16 = | | | −4.0926E+00 | 8.5274E−01 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.55 | (R5 + R6)/(R5 − R6) | 0.91 |
| Fno | 2.65 | (R7 + R8)/(R7 − R8) | 0.71 |
| HFOV [deg.] | 39.2 | (R6 + R7)/((R6 − R7)*100) | −0.01 |
| V1 | 23.5 | f2/f1 | −0.70 |
| V1/V4 | 1.00 | f4/f1 | 0.44 |
| CT2/(CT3 + CT4) | 0.96 | SD/TD | 0.60 |
| (T23 + T34)/T12 | 0.26 | SAG11/CT1 | 2.73 |
| T34/T23 | 0.31 | N1 + N2 + N3 + N4 | 6.35 |
| (R3 + R4)/(R3 − R4) | 0.32 | TL/ImgH | 3.17 |

4th Embodiment

Figure 4A:
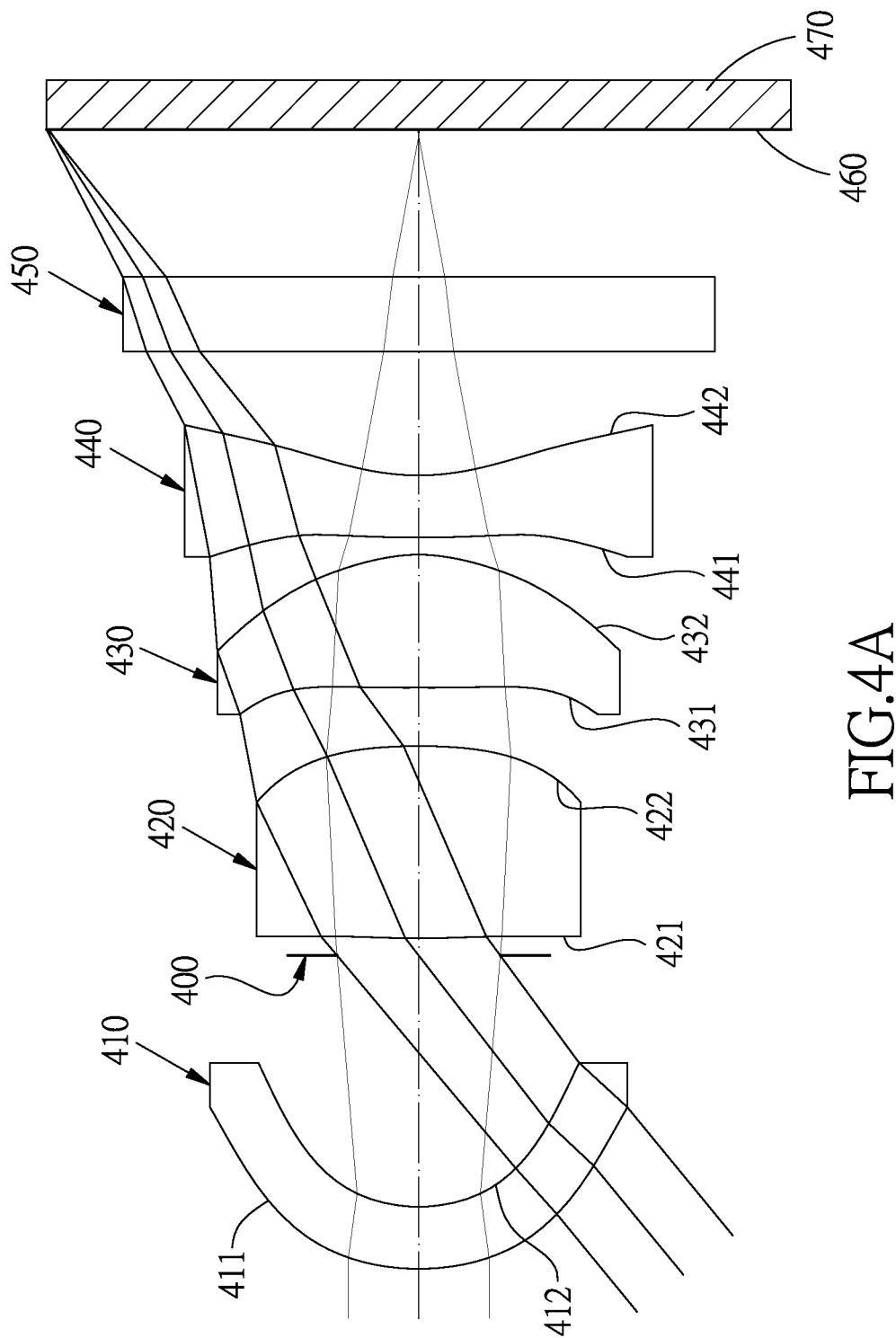
FIG. 4A is a schematic view of an imaging unit according to the 4th embodiment of the present disclosure.
Figure 4B:
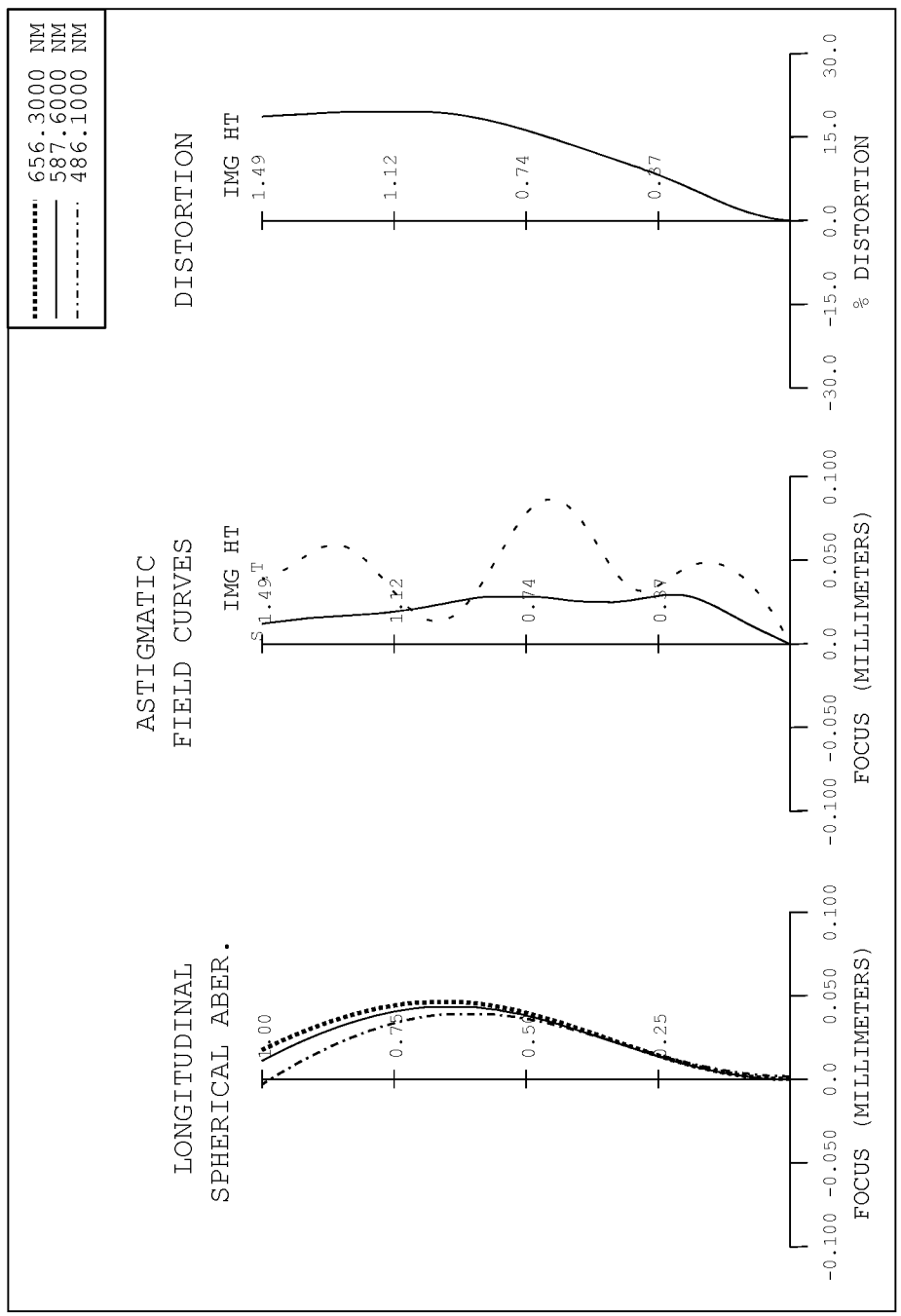
FIG. 4B shows spherical aberration curves, astigmatic field curves and a distortion curve of the imaging unit according to the 4th embodiment.

FIG. 4A is a schematic view of an imaging unit according to the 4th embodiment of the present disclosure. FIG. 4B shows, in order from left to right, spherical aberration curves, astigmatic field curves and a distortion curve of the imaging unit according to the 4th embodiment.

In FIG. 4A, the imaging unit includes the optical photographing lens assembly (not otherwise herein labeled) of the present disclosure and an image sensor 470. The optical photographing lens assembly includes, in order from an object side to an image side, a first lens element 410, an aperture stop 400, a second lens element 420, a third lens element 430, a fourth lens element 440, an IR-cut filter 450 and an image plane 460, wherein the optical photographing lens assembly has a total of four non-cemented lens elements (410-440) with refractive power.

The first lens element 410 with negative refractive power has an object-side surface 411 being convex in a paraxial region thereof and an image-side surface 412 being concave in a paraxial region thereof, which are both aspheric, and the first lens element 410 is made of plastic material.

The second lens element 420 with positive refractive power has an object-side surface 421 being convex in a paraxial region thereof and an image-side surface 422 being convex in a paraxial region thereof, which are both aspheric, and the second lens element 420 is made of plastic material.

The third lens element 430 with positive refractive power has an object-side surface 431 being convex in a paraxial region thereof and an image-side surface 432 being convex in a paraxial region thereof, which are both aspheric, and the third lens element 430 is made of plastic material. Moreover, a curvature of the image-side surface 432 of the third lens element 430 in an off-axis region thereof is smaller than a curvature of the image-side surface 432 of the third lens element 430 in the paraxial region.

The fourth lens element 440 with negative refractive power has an object-side surface 441 being convex in a paraxial region thereof and an image-side surface 442 being concave in a paraxial region thereof, which are both aspheric, and the fourth lens element 440 is made of plastic material. Furthermore, the image-side surface 442 of the fourth lens element 440 includes a convex portion in an off-axis region thereof.

The IR-cut filter 450 is made of glass and located between the fourth lens element 440 and the image plane 460, and will not affect the focal length of the optical photographing lens assembly. The image sensor 470 is disposed on or near the image plane 460 of the optical photographing lens assembly.

The detailed optical data of the 4th embodiment are shown in Table 7 and the aspheric surface data are shown in Table 8 below.

TABLE 7

4th Embodiment
f = 1.50 mm, Fno = 2.65, HFOV = 39.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 0.986 | ASP | 0.250 | Plastic | 1.639 | 23.5 | −3.79 |
| 2 | | 0.632 | ASP | 1.014 | | | | |
| 3 | Ape. Stop | Plano | | 0.070 | | | | |
| 4 | Lens 2 | 4.369 | ASP | 0.776 | Plastic | 1.535 | 55.7 | 2.71 |
| 5 | | −2.034 | ASP | 0.235 | | | | |
| 6 | Lens 3 | 10.313 | ASP | 0.537 | Plastic | 1.535 | 55.7 | 1.18 |
| 7 | | −0.662 | ASP | 0.070 | | | | |
| 8 | Lens 4 | 16.341 | ASP | 0.250 | Plastic | 1.639 | 23.5 | −1.67 |
| 9 | | 0.997 | ASP | 0.500 | | | | |
| 10 | IR-cut filter | Plano | | 0.300 | Glass | 1.517 | 64.2 | — |
| 11 | | Plano | | 0.595 | | | | |
| 12 | Image | Plano | | — | | | | |

Note:
Reference wavelength is 587.6 nm (d-line).

TABLE 8

| Aspheric Coefficients | | | | |
|---|---|---|---|---|
| Surface # | 1 | 2 | 4 | 5 |
| k = | −6.7637E−01 | −1.9096E+00 | −8.9524E+01 | 5.7270E+00 |
| A4 = | 6.8841E−01 | 1.6910E+00 | −1.6358E−01 | −2.6720E−01 |
| A6 = | −9.0616E−01 | 5.0025E−01 | −2.2689E+00 | −1.4823E+00 |

TABLE 8-continued

| Aspheric Coefficients | | | | |
|---|---|---|---|---|
| A8 = | 3.3436E+00 | 5.1866E+00 | 2.4533E+01 | 3.8415E+00 |
| A10 = | −4.3968E+00 | −1.4723E+01 | −1.8986E+02 | −5.3161E+00 |
| A12 = | 1.4880E+00 | 5.4402E−01 | 6.2334E+02 | 3.9044E+00 |
| A14 = | | | −7.0874E+02 | −1.7012E+00 |

| Surface # | 6 | 7 | 8 | 9 |
|---|---|---|---|---|
| k = | 7.8391E+01 | −7.4671E+00 | −5.0000E+01 | −6.5070E+00 |
| A4 = | 2.0838E−03 | −1.2281E−01 | 1.2201E+00 | 5.3281E−01 |
| A6 = | −1.3670E+00 | −2.0366E+00 | −9.4390E+00 | −3.7982E+00 |
| A8 = | −2.4924E−01 | 5.3909E+00 | 2.3893E+01 | 9.8096E+00 |
| A10 = | 2.3626E+00 | −6.2225E+00 | −2.7780E+01 | −1.3745E+01 |
| A12 = | −9.1187E−01 | 2.9616E+00 | 1.1376E+01 | 1.1082E+01 |
| A14 = | 2.5721E−01 | −1.1138E−01 | 4.5134E+00 | −4.8026E+00 |
| A16 = | | | −4.0926E+00 | 8.5274E−01 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [[mm] | 1.50 | (R5 + R6)/(R5 − R6) | 0.88 |
| Fno | 2.65 | (R7 + R8)/(R7 − R8) | 1.13 |
| HFOV [deg.] | 39.4 | (R6 + R7)/((R6 − R7)*100) | −0.01 |
| V1 | 23.5 | f2/f1 | −0.71 |
| V1/V4 | 1.00 | f4/f1 | 0.44 |
| CT2/(CT3 + CT4) | 0.99 | SD/TD | 0.61 |
| (T23 + T34)/T12 | 0.28 | SAG11/CT1 | 2.61 |
| T34/T23 | 0.30 | N1 + N2 + N3 + N4 | 6.35 |
| (R3 + R4)/(R3 − R4) | 0.36 | TL/ImgH | 3.09 |

5th Embodiment

Figure 5A:
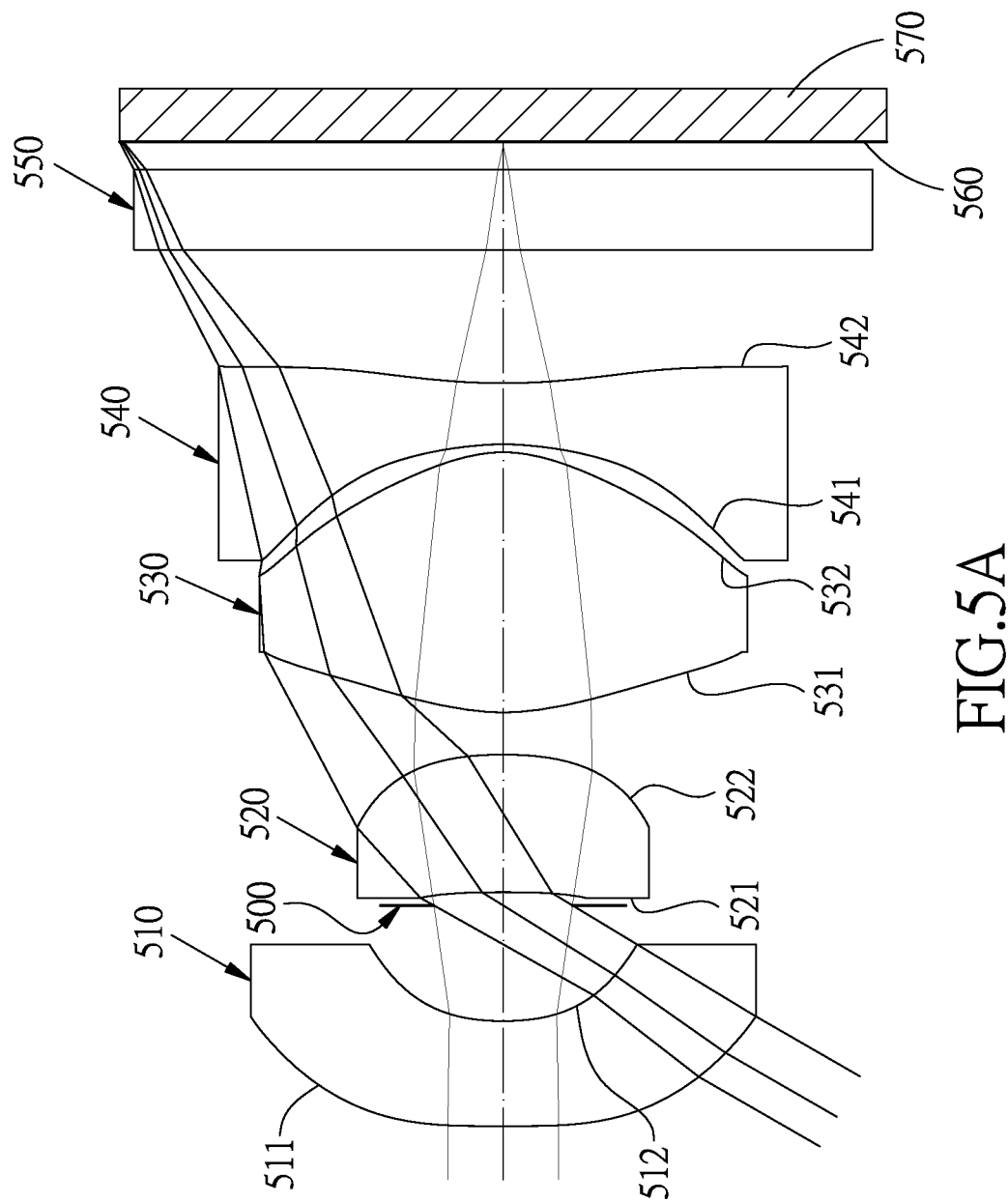
FIG. 5A is a schematic view of an imaging unit according to the 5th embodiment of the present disclosure.
Figure 5B:
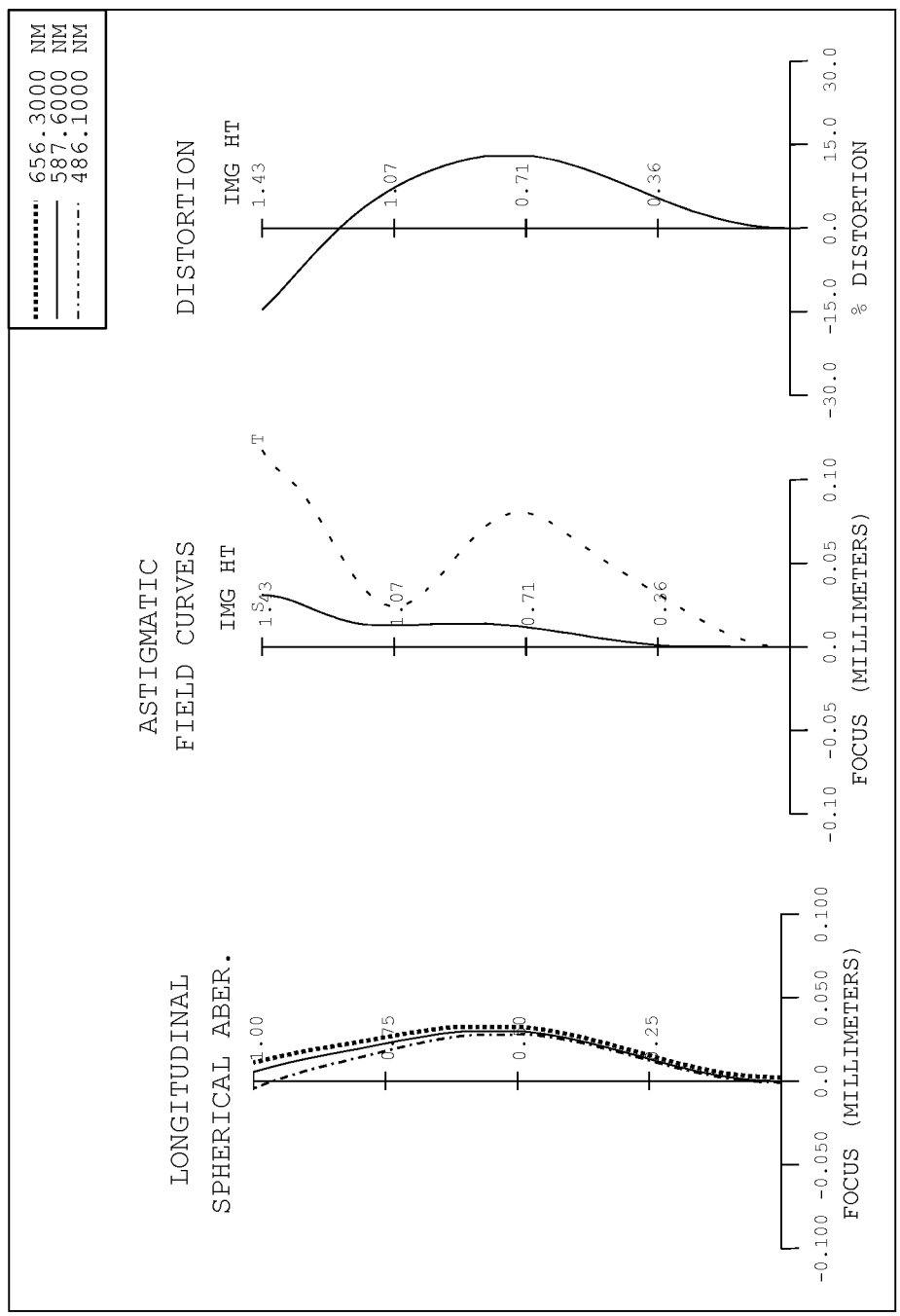
FIG. 5B shows spherical aberration curves, astigmatic field curves and a distortion curve of the imaging unit according to the 5th embodiment.

FIG. 5A is a schematic view of an imaging unit according to the 5th embodiment of the present disclosure. FIG. 5B shows, in order from left to right, spherical aberration curves, astigmatic field curves and a distortion curve of the imaging unit according to the 5th embodiment.

In FIG. 5A, the imaging unit includes the optical photographing lens assembly (not otherwise herein labeled) of the present disclosure and an image sensor 570. The optical photographing lens assembly includes, in order from an object side to an image side, a first lens element 510, an aperture stop 500, a second lens element 520, a third lens element 530, a fourth lens element 540, an IR-cut filter 550 and an image plane 560, wherein the optical photographing lens assembly has a total of four non-cemented lens elements (510-540) with refractive power.

The first lens element 510 with negative refractive power has an object-side surface 511 being convex in a paraxial region thereof and an image-side surface 512 being concave in a paraxial region thereof, which are both aspheric, and the first lens element 510 is made of plastic material.

The second lens element 520 with positive refractive power has an object-side surface 521 being concave in a paraxial region thereof and an image-side surface 522 being convex in a paraxial region thereof, which are both aspheric, and the second lens element 520 is made of plastic material.

The third lens element 530 with positive refractive power has an object-side surface 531 being convex in a paraxial region thereof and an image-side surface 532 being convex in a paraxial region thereof, which are both aspheric, and the third lens element 530 is made of plastic material. Moreover, a curvature of the image-side surface 532 of the third lens element 530 in an off-axis region thereof is smaller than a curvature of the image-side surface 532 of the third lens element 530 in the paraxial region.

The fourth lens element 540 with negative refractive power has an object-side surface 541 being concave in a paraxial region thereof and an image-side surface 542 being concave in a paraxial region thereof, which are both aspheric, and the fourth lens element 540 is made of plastic material. Furthermore, the image-side surface 542 of the fourth lens element 540 includes a convex portion in an off-axis region thereof.

The IR-cut filter 550 is made of glass and located between the fourth lens element 540 and the image plane 560, and will not affect the focal length of the optical photographing lens assembly. The image sensor 570 is disposed on or near the image plane 560 of the optical photographing lens assembly.

The detailed optical data of the 5th embodiment are shown in Table 9 and the aspheric surface data are shown in Table 10 below.

TABLE 9

5th Embodiment
f = 0.96 mm, Fno = 2.30, HFOV = 60.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 31.580 | ASP | 0.394 | Plastic | 1.535 | 55.7 | −1.78 |
| 2 | | 0.921 | ASP | 0.434 | | | | |
| 3 | Ape. Stop | Plano | | 0.050 | | | | |
| 4 | Lens 2 | −4.848 | ASP | 0.516 | Plastic | 1.535 | 55.7 | 3.55 |

TABLE 9-continued

5th Embodiment
f = 0.96 mm, Fno = 2.30, HFOV = 60.1 deg.

| Surface # | | Curvature Radius | Thickness | Material | Index | Abbe # | Focal Length |
|---|---|---|---|---|---|---|---|
| 5 | | −1.415 | ASP | 0.159 | | | |
| 6 | Lens 3 | 0.926 | ASP | 0.976 | Plastic | 1.544 | 55.9 | 0.81 |
| 7 | | −0.527 | ASP | 0.030 | | | |
| 8 | Lens 4 | −1.027 | ASP | 0.230 | Plastic | 1.650 | 21.4 | −1.17 |
| 9 | | 3.149 | ASP | 0.500 | | | |
| 10 | IR-cut filter | Plano | | 0.300 | Glass | 1.517 | 64.2 | — |
| 11 | | Plano | | 0.106 | | | |
| 12 | Image | Plano | | — | | | |

Note:
Reference wavelength is 587.6 nm (d-line).

TABLE 10

Aspheric Coefficients

| Surface # | 1 | 2 | 4 | 5 |
|---|---|---|---|---|
| k = | −7.9189E+01 | −5.5854E−01 | −3.5830E+01 | 5.0231E+00 |
| A4 = | 1.3086E+00 | 3.0007E+00 | −1.3010E+00 | −1.4008E+00 |
| A6 = | −2.8439E+00 | −5.4343E+00 | 1.2169E+01 | 1.0903E+00 |
| A8 = | 4.6557E+00 | 6.7370E+00 | −2.1243E+02 | 1.6089E+00 |
| A10 = | −4.1183E+00 | 5.9550E+01 | 8.1938E+02 | −1.3702E+01 |
| A12 = | 1.4880E+00 | −1.7435E+02 | 6.2334E+02 | 3.9044E+00 |
| A14 = | | | −7.0874E+02 | −1.7012E+00 |

| Surface # | 6 | 7 | 8 | 9 |
|---|---|---|---|---|
| k = | −8.9417E+00 | −3.1335E+00 | −9.9745E−01 | −9.0000E+01 |
| A4 = | 4.3733E−02 | 5.0926E−01 | 1.6132E+00 | 7.9205E−01 |
| A6 = | −9.7338E−02 | −2.5112E+00 | −9.6740E+00 | −4.2154E+00 |
| A8 = | −4.8012E−01 | 5.2340E+00 | 2.3580E+01 | 1.0079E+01 |
| A10 = | 1.2434E+00 | −6.0310E+00 | −2.7837E+01 | −1.3753E+01 |
| A12 = | −9.1187E−01 | 2.9616E+00 | 1.1389E+01 | 1.1012E+01 |
| A14 = | 2.5721E−01 | −1.1138E−01 | 4.9429E+00 | −4.8468E+00 |
| A16 = | | | −4.0310E+00 | 9.1478E−01 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 0.96 | (R5 + R6)/(R5 − R6) | 0.27 |
| Fno | 2.30 | (R7 + R8)/(R7 − R8) | −0.51 |
| HFOV [deg.] | 60.1 | (R6 + R7)/((R6 − R7)*100) | −0.03 |
| V1 | 55.7 | f2/f1 | −1.99 |
| V1/V4 | 2.60 | f4/f1 | 0.66 |
| CT2/(CT3 + CT4) | 0.43 | SD/TD | 0.70 |
| (T23 + T34)/T12 | 0.39 | SAG11/CT1 | 1.04 |
| T34/T23 | 0.19 | N1 + N2 + N3 + N4 | 6.26 |
| (R3 + R4)/(R3 − R4) | 1.82 | TL/ImgH | 2.58 |

6th Embodiment

Figure 6A:
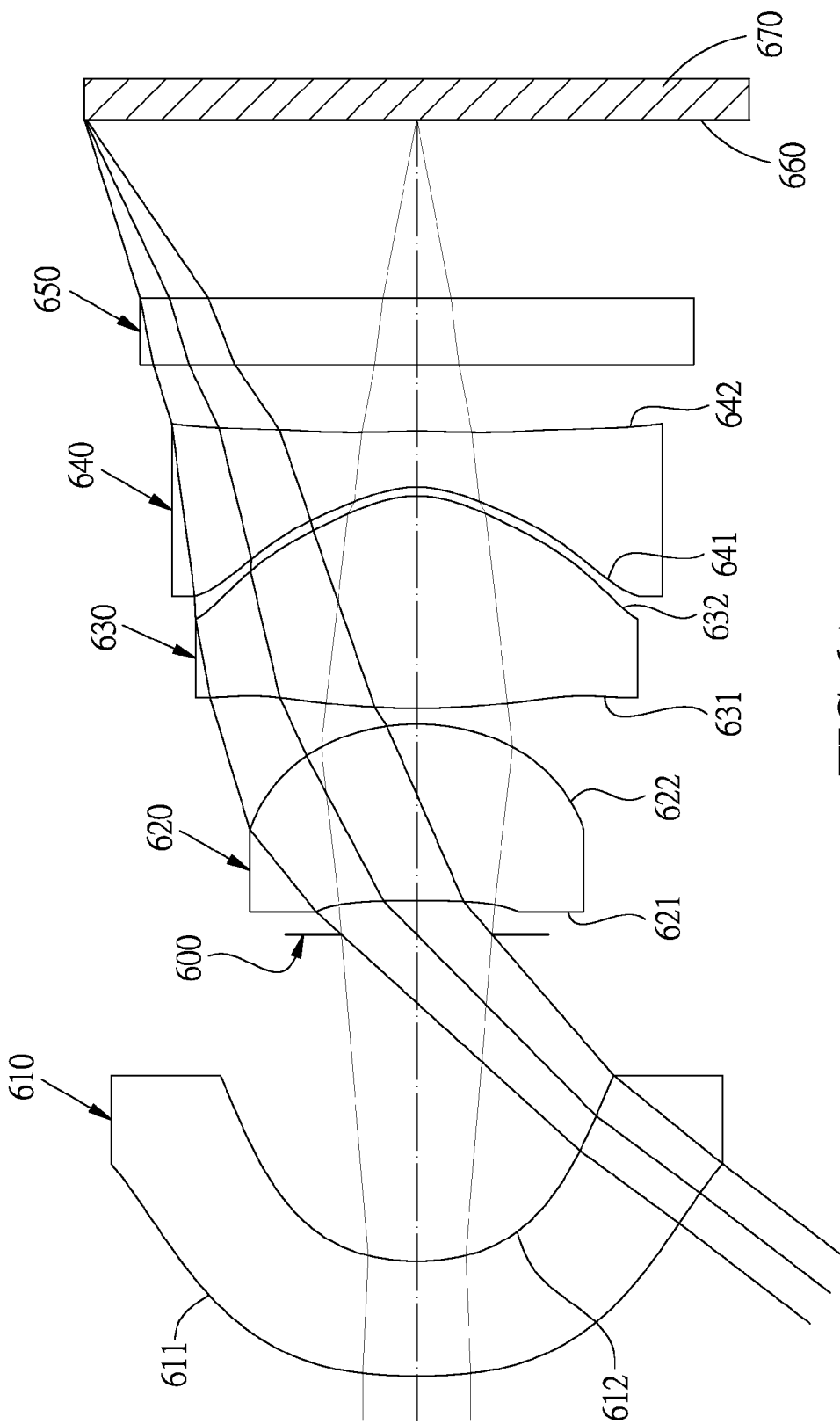
FIG. 6A is a schematic view of an imaging unit according to the 6th embodiment of the present disclosure.
Figure 6B:
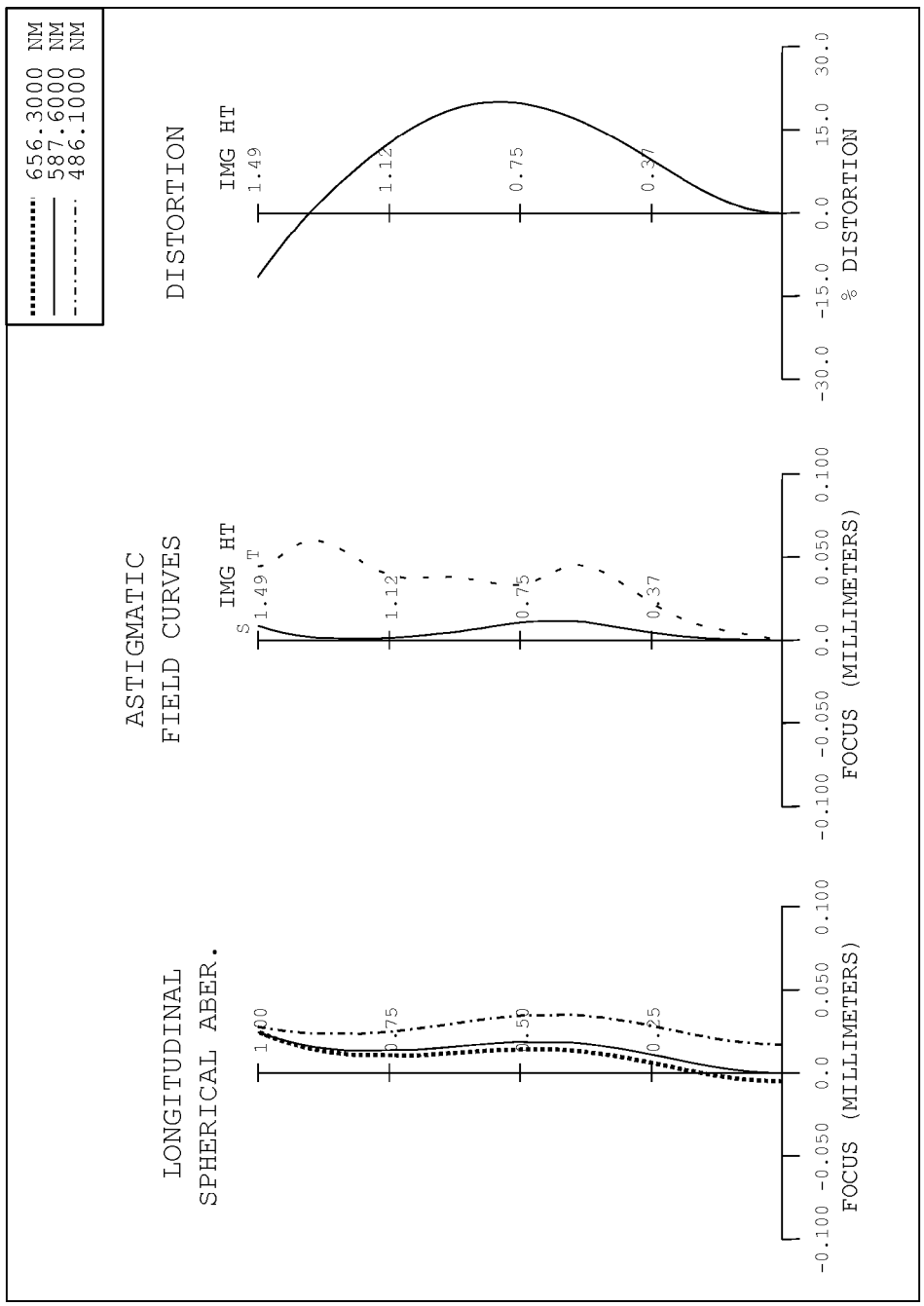
FIG. 6B shows spherical aberration curves, astigmatic field curves and a distortion curve of the imaging unit according to the 6th embodiment.

FIG. 6A is a schematic view of an imaging unit according to the 6th embodiment of the present disclosure. FIG. 6B shows, in order from left to right, spherical aberration curves, astigmatic field curves and a distortion curve of the imaging unit according to the 6th embodiment.

In FIG. 6A, the imaging unit includes the optical photographing lens assembly (not otherwise herein labeled) of the present disclosure and an image sensor 670. The optical photographing lens assembly includes, in order from an object side to an image side, a first lens element 610, an aperture stop 600, a second lens element 620, a third lens element 630, a fourth lens element 640, an IR-cut filter 650 and an image plane 660, wherein the optical photographing lens assembly has a total of four non-cemented lens elements (610-640) with refractive power.

The first lens element 610 with negative refractive power has an object-side surface 611 being convex in a paraxial region thereof and an image-side surface 612 being concave in a paraxial region thereof, which are both aspheric, and the first lens element 610 is made of plastic material.

The second lens element 620 with positive refractive power has an object-side surface 621 being concave in a paraxial region thereof and an image-side surface 622 being convex in a paraxial region thereof, which are both aspheric, and the second lens element 620 is made of plastic material.

The third lens element 630 with positive refractive power has an object-side surface 631 being convex in a paraxial region thereof and an image-side surface 632 being convex in a paraxial region thereof, which are both aspheric, and the third lens element 630 is made of plastic material. Moreover, a curvature of the image-side surface 632 of the third lens element 630 in an off-axis region thereof is smaller than a curvature of the image-side surface 632 of the third lens element 630 in the paraxial region.

The fourth lens element 640 with negative refractive power has an object-side surface 641 being concave in a paraxial region thereof and an image-side surface 642 being convex in a paraxial region thereof, which are both aspheric, and the fourth lens element 640 is made of plastic material. Furthermore, the image-side surface 642 of the fourth lens element 640 includes a concave portion in an off-axis region thereof.

The IR-cut filter 650 is made of glass and located between the fourth lens element 640 and the image plane 660, and will not affect the focal length of the optical photographing lens assembly. The image sensor 670 is disposed on or near the image plane 660 of the optical photographing lens assembly.

The detailed optical data of the 6th embodiment are shown in Table 11 and the aspheric surface data are shown in Table 12 below.

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.29 | (R5 + R6)/(R5 − R6) | 0.70 |
| Fno | 2.65 | (R7 + R8)/(R7 − R8) | −1.39 |
| HFOV [deg.] | 52.5 | (R6 + R7)/((R6 − R7)*100) | 0.41 |
| V1 | 23.8 | f2/f1 | −0.66 |
| V1/V4 | 1.00 | f4/f1 | 0.30 |
| CT2/(CT3 + CT4) | 0.66 | SD/TD | 0.53 |
| (T23 + T34)/T12 | 0.07 | SAG11/CT1 | 1.85 |
| T34/T23 | 0.59 | N1 + N2 + N3 + N4 | 6.36 |
| (R3 + R4)/(R3 − R4) | 1.41 | TL/ImgH | 3.79 |

TABLE 11

6th Embodiment
f = 1.29 mm, Fno = 2.65, HFOV = 52.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.600 | ASP | 0.516 | Plastic | 1.634 | 23.8 | −3.24 |
| 2 | | 1.059 | ASP | 1.467 | | | | |
| 3 | Ape. Stop | Plano | | 0.153 | | | | |
| 4 | Lens 2 | −6.064 | ASP | 0.793 | Plastic | 1.544 | 55.9 | 2.15 |
| 5 | | −1.026 | ASP | 0.070 | | | | |
| 6 | Lens 3 | 2.939 | ASP | 0.955 | Plastic | 1.544 | 55.9 | 0.90 |
| 7 | | −0.517 | ASP | 0.041 | | | | |
| 8 | Lens 4 | −0.493 | ASP | 0.250 | Plastic | 1.634 | 23.8 | −0.97 |
| 9 | | −3.004 | ASP | 0.300 | | | | |
| 10 | IR-cut filter | Plano | | 0.300 | Glass | 1.517 | 64.2 | — |
| 11 | | Plano | | 0.799 | | | | |
| 12 | Image | Plano | | — | | | | |

Note:
Reference wavelength is 587.6 nm (d-line).

TABLE 12

Aspheric Coefficients

| Surface # | 1 | 2 | 4 | 5 |
|---|---|---|---|---|
| k = | 2.8455E−01 | −1.7701E+00 | −7.3234E+01 | 3.0477E−01 |
| A4 = | 3.9283E−01 | 9.3568E−01 | −5.8014E−01 | −2.7603E−01 |
| A6 = | −3.2750E−01 | 2.8547E−01 | 3.7588E+00 | 6.8214E−01 |
| A8 = | 2.9289E−01 | −1.5940E+00 | −7.1490E+01 | 8.3551E−01 |
| A10 = | −1.4363E−01 | 2.8865E+00 | 5.8837E+02 | −1.7470E+01 |
| A12 = | 2.3823E−02 | −1.9625E+00 | −2.7117E+03 | 4.3580E+01 |
| A14 = | | | 4.8443E+03 | −3.5576E+01 |

| Surface # | 6 | 7 | 8 | 9 |
|---|---|---|---|---|
| k = | −3.3332E+00 | −2.7297E+00 | −3.0747E+00 | −2.5236E+00 |
| A4 = | −3.2954E−01 | 7.3175E−02 | 7.4787E−01 | 1.4437E+00 |
| A6 = | 1.8096E+00 | 1.8096E+00 | −1.2578E+00 | −4.6517E+00 |
| A8 = | −4.9387E+00 | −8.1291E+00 | −4.6192E+00 | 7.9688E+00 |
| A10 = | 5.8910E+00 | 1.2694E+01 | 1.5777E+01 | −7.9313E+00 |
| A12 = | −3.2517E+00 | −9.0465E+00 | −1.8953E+01 | 4.6174E+00 |
| A14 = | 7.1954E−01 | 2.5613E+00 | 1.0687E+01 | −1.4510E+00 |
| A16 = | | | −2.3782E+00 | 1.8770E−01 |

7th Embodiment

Figure 7A:
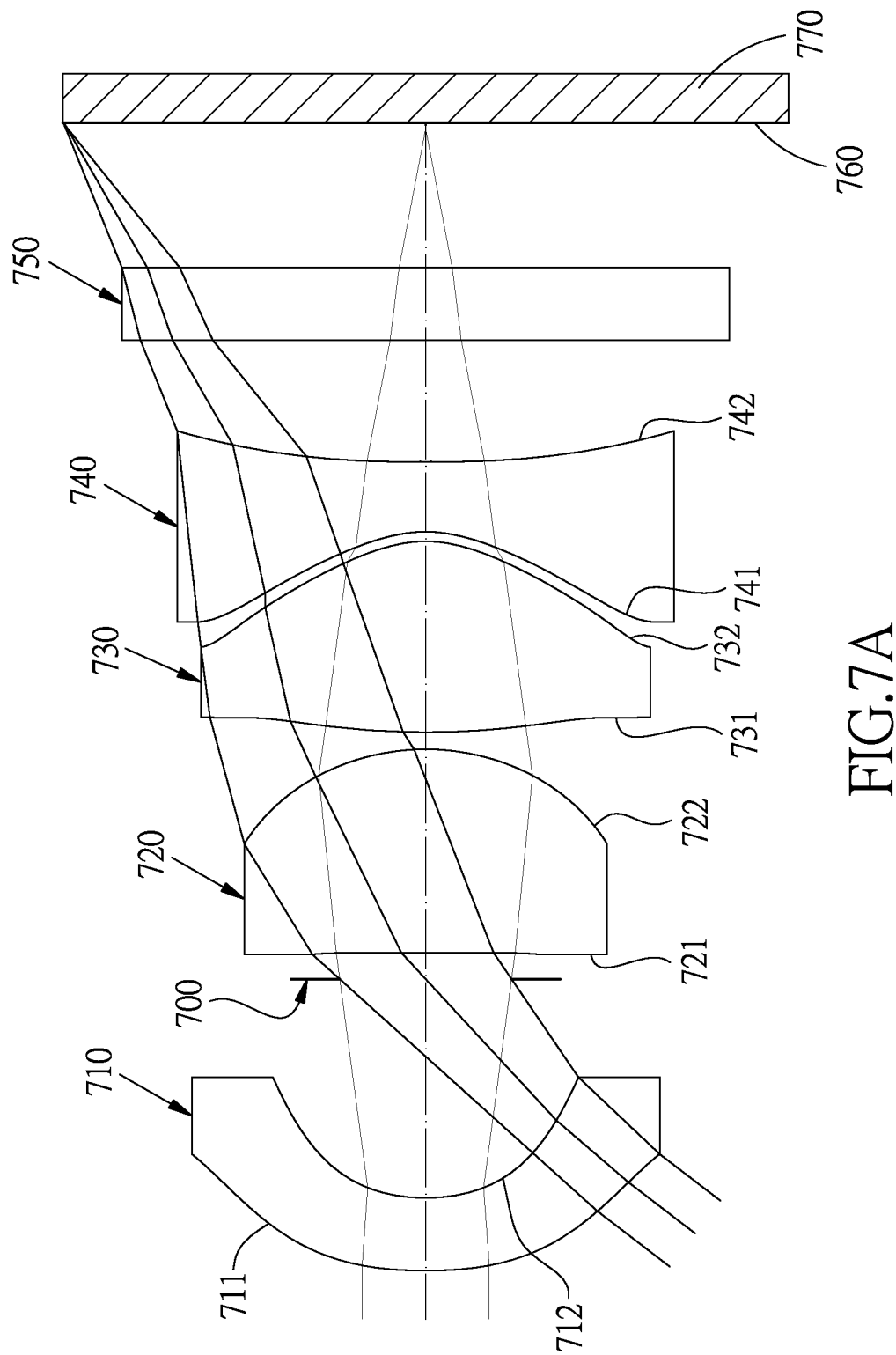
FIG. 7A is a schematic view of an imaging unit according to the 7th embodiment of the present disclosure.
Figure 7B:
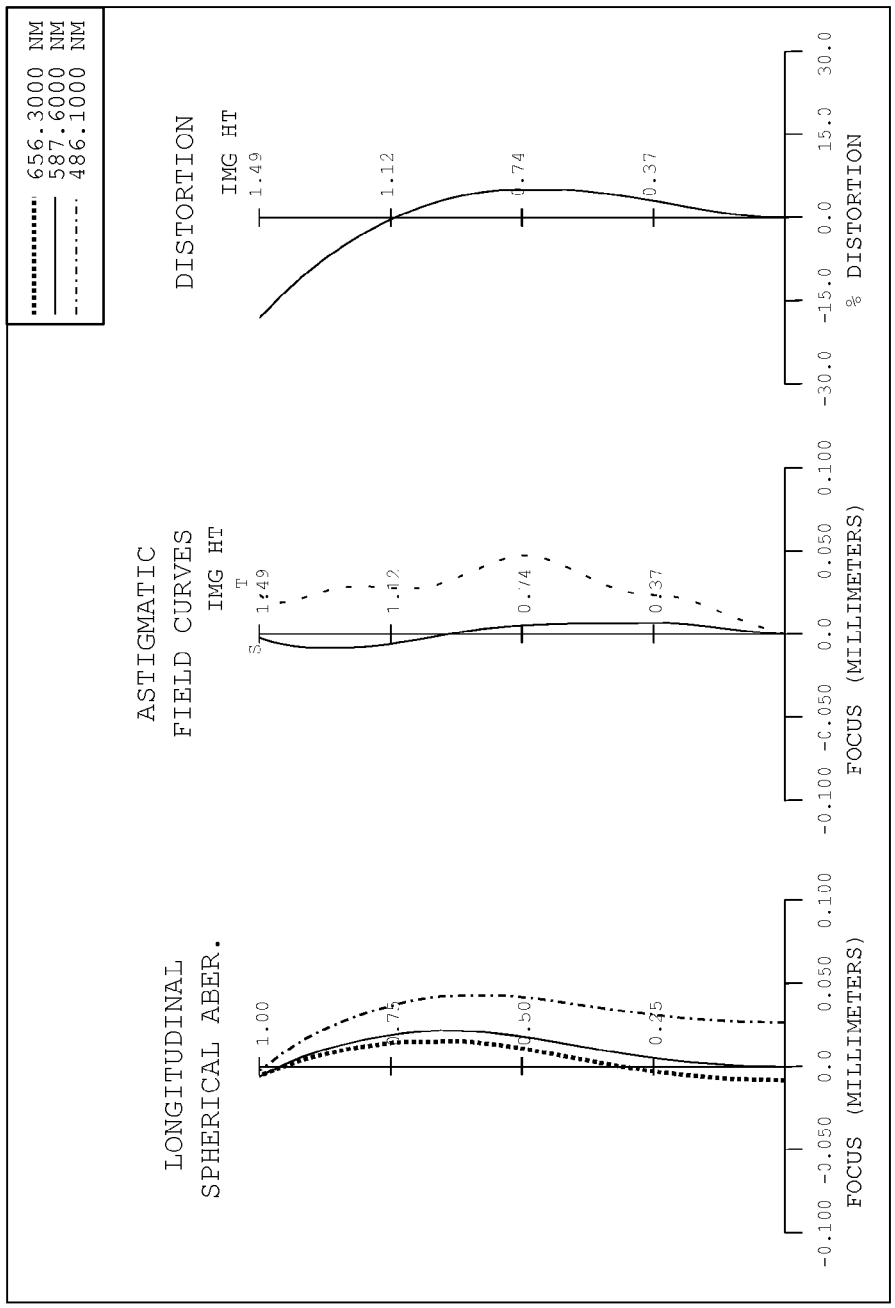
FIG. 7B shows spherical aberration curves, astigmatic field curves and a distortion curve of the imaging unit according to the 7th embodiment.

FIG. 7A is a schematic view of an imaging unit according to the 7th embodiment of the present disclosure. FIG. 7B shows, in order from left to right, spherical aberration curves, astigmatic field curves and a distortion curve of the imaging unit according to the 7th embodiment.

In FIG. 7A, the imaging unit includes the optical photographing lens assembly (not otherwise herein labeled) of the present disclosure and an image sensor 770. The optical photographing lens assembly includes, in order from an object side to an image side, a first lens element 710, an aperture stop 700, a second lens element 720, a third lens element 730, a fourth lens element 740, an IR-cut filter 750 and an image plane 760, wherein the optical photographing lens assembly has a total of four non-cemented lens elements (710-740) with refractive power.

The first lens element 710 with negative refractive power has an object-side surface 711 being convex in a paraxial region thereof and an image-side surface 712 being concave in a paraxial region thereof, which are both aspheric, and the first lens element 710 is made of plastic material.

The second lens element 720 with positive refractive power has an object-side surface 721 being convex in a paraxial region thereof and an image-side surface 722 being convex in a paraxial region thereof, which are both aspheric, and the second lens element 720 is made of plastic material.

The third lens element 730 with positive refractive power has an object-side surface 731 being convex in a paraxial region thereof and an image-side surface 732 being convex in a paraxial region thereof, which are both aspheric, and the third lens element 730 is made of plastic material. Moreover, a curvature of the image-side surface 732 of the third lens element 730 in an off-axis region thereof is smaller than a curvature of the image-side surface 732 of the third lens element 730 in the paraxial region.

The fourth lens element 740 with negative refractive power has an object-side surface 741 being concave in a paraxial region thereof and an image-side surface 742 being concave in a paraxial region thereof, which are both aspheric, and the fourth lens element 740 is made of plastic material. Furthermore, the image-side surface 742 of the fourth lens element 740 includes a convex portion in an off-axis region thereof.

The IR-cut filter 750 is made of glass and located between the fourth lens element 740 and the image plane 760, and will not affect the focal length of the optical photographing lens assembly. The image sensor 770 is disposed on or near the image plane 760 of the optical photographing lens assembly.

The detailed optical data of the 7th embodiment are shown in Table 13 and the aspheric surface data are shown in Table 14 below.

TABLE 13

7th Embodiment
f = 1.39 mm, Fno = 2.65, HFOV = 52.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.853 | ASP | 0.300 | Plastic | 1.634 | 23.8 | −2.37 |
| 2 | | 0.778 | ASP | 0.901 | | | | |
| 3 | Ape. Stop | Plano | | 0.108 | | | | |
| 4 | Lens 2 | 14.162 | ASP | 0.839 | Plastic | 1.544 | 55.9 | 1.63 |
| 5 | | −0.926 | ASP | 0.070 | | | | |
| 6 | Lens 3 | 3.541 | ASP | 0.786 | Plastic | 1.544 | 55.9 | 0.89 |
| 7 | | −0.517 | ASP | 0.040 | | | | |
| 8 | Lens 4 | −0.535 | ASP | 0.288 | Plastic | 1.634 | 23.8 | −0.84 |
| 9 | | 111.111 | ASP | 0.500 | | | | |
| 10 | IR-cut filter | Plano | | 0.300 | Glass | 1.517 | 64.2 | — |
| 11 | | Plano | | 0.597 | | | | |
| 12 | Image | Plano | | — | | | | |

Note:
Reference wavelength is 587.6 nm (d-line).

TABLE 14

Aspheric Coefficients

| Surface # | 1 | 2 | 4 | 5 |
|---|---|---|---|---|
| k = | 2.8491E−01 | −3.5515E+00 | −7.3234E+01 | −2.9609E−02 |
| A4 = | 7.3867E−01 | 2.2686E+00 | −1.7228E−01 | 2.0033E−01 |
| A6 = | −1.1827E+00 | −5.9920E−01 | −9.9089E−01 | −8.8009E−01 |
| A8 = | 1.7394E+00 | −7.6155E+00 | 1.3425E+01 | 1.5428E+00 |
| A10 = | −1.6373E+00 | 3.8873E+01 | −1.2275E+02 | −1.5927E+00 |
| A12 = | 5.4690E−01 | −5.3419E+01 | 4.1614E+02 | 2.1844E−01 |
| A14 = | | | −4.3296E+02 | 3.4862E−01 |

| Surface # | 6 | 7 | 8 | 9 |
|---|---|---|---|---|
| k = | −3.3332E+00 | −3.3702E+00 | −2.7696E+00 | −2.5236E+00 |
| A4 = | 1.6052E−01 | 1.2311E−01 | 1.1311E+00 | 7.5668E−01 |
| A6 = | −8.4492E−01 | −1.3219E+00 | −6.9197E+00 | −2.7181E+00 |
| A8 = | 2.4024E+00 | 4.8706E+00 | 2.1703E+01 | 5.7313E+00 |
| A10 = | −5.3668E+00 | −9.4193E+00 | −3.9623E+01 | −7.1923E+00 |

TABLE 14-continued

| Aspheric Coefficients | | | |
|---|---|---|---|
| A12 = | 5.7301E+00 | 8.5203E+00 | 4.2055E+01 | 5.2847E+00 |
| A14 = | −2.1166E+00 | −2.7152E+00 | −2.3515E+01 | −2.0792E+00 |
| A16 = | | | 5.3032E+00 | 3.3260E−01 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.39 | (R5 + R6)/(R5 − R6) | 0.74 |
| Fno | 2.65 | (R7 + R8)/(R7 − R8) | −0.99 |
| HFOV [deg.] | 52.5 | (R6 + R7)/((R6 − R7)*100) | −0.61 |
| V1 | 23.8 | f2/f1 | −0.69 |
| V1/V4 | 1.00 | f4/f1 | 0.35 |
| CT2/(CT3 + CT4) | 0.78 | SD/TD | 0.64 |
| (T23 + T34)/T12 | 0.11 | SAG11/CT1 | 1.60 |
| T34/T23 | 0.57 | N1 + N2 + N3 + N4 | 6.36 |
| (R3 + R4)/(R3 − R4) | 0.88 | TL/ImgH | 3.17 |

8th Embodiment

Figure 8A:
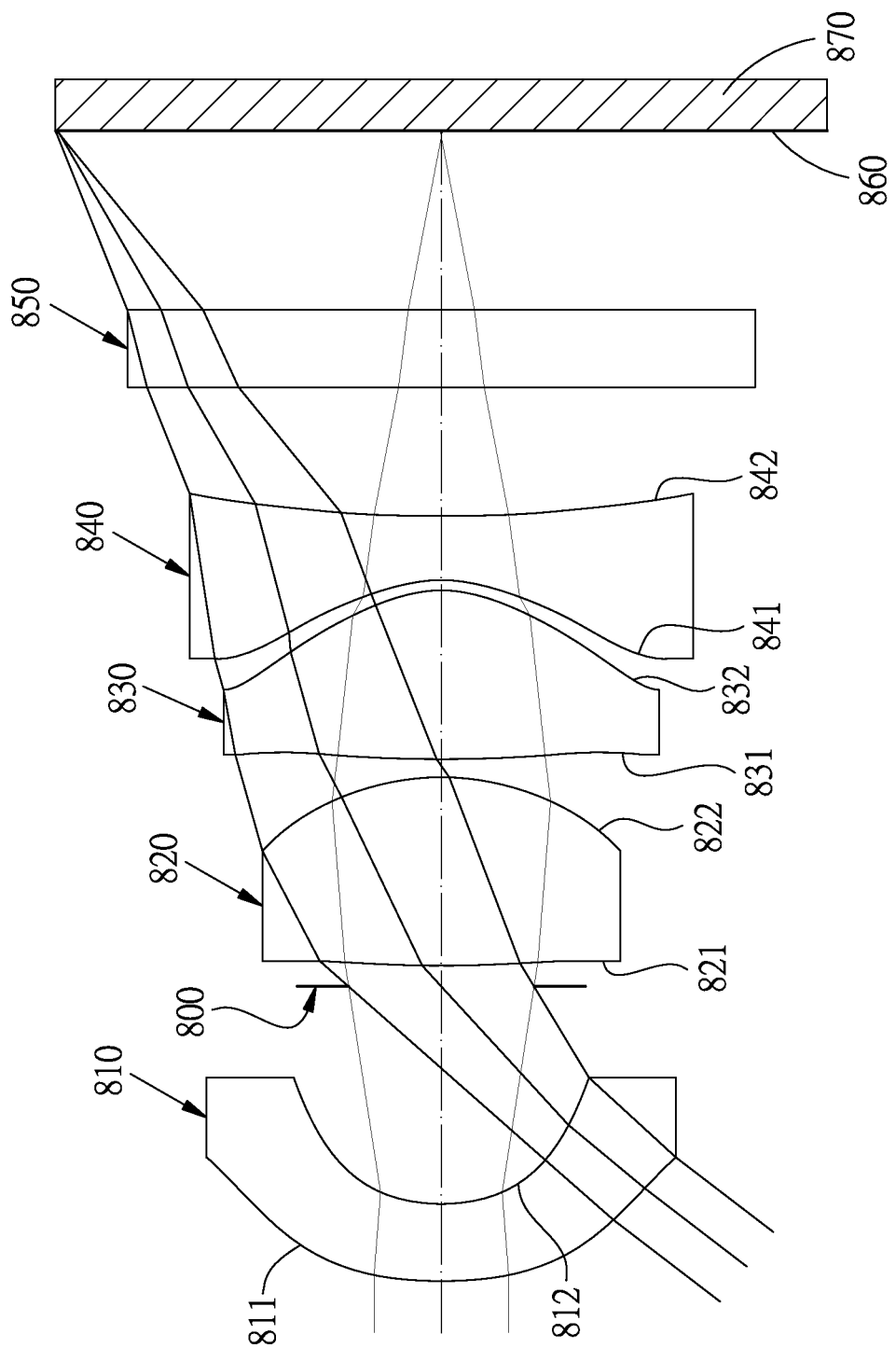
FIG. 8A is a schematic view of an imaging unit according to the 8th embodiment of the present disclosure.
Figure 8B:
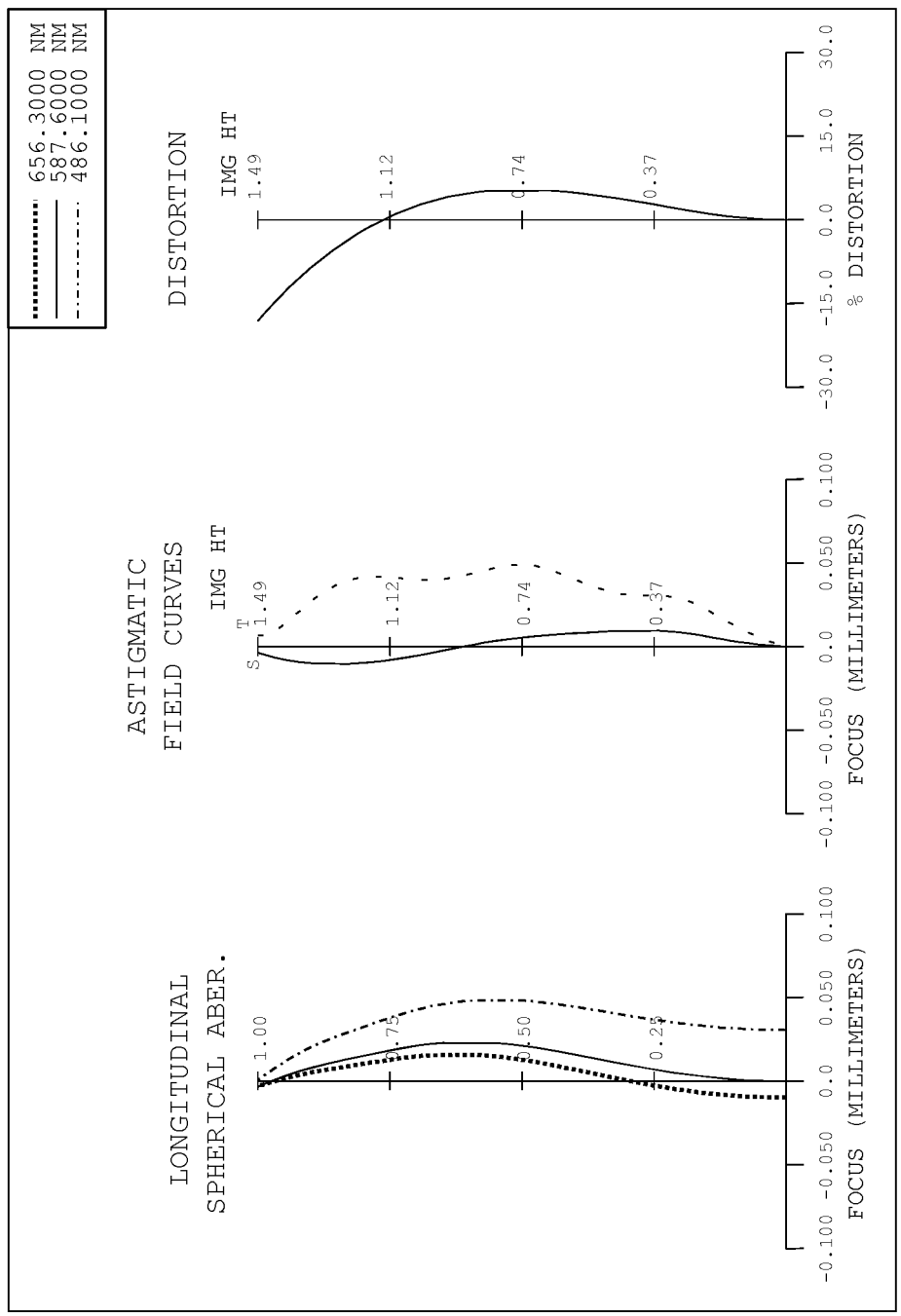
FIG. 8B shows spherical aberration curves, astigmatic field curves and a distortion curve of the imaging unit according to the 8th embodiment.

FIG. 8A is a schematic view of an imaging unit according to the 8th embodiment of the present disclosure. FIG. 8B shows, in order from left to right, spherical aberration curves, astigmatic field curves and a distortion curve of the imaging unit according to the 8th embodiment.

In FIG. 8A, the imaging unit includes the optical photographing lens assembly (not otherwise herein labeled) of the present disclosure and an image sensor 870. The optical photographing lens assembly includes, in order from an object side to an image side, a first lens element 810, an aperture stop 800, a second lens element 820, a third lens element 830, a fourth lens element 840, an IR-cut filter 850 and an image plane 860, wherein the optical photographing lens assembly has a total of four non-cemented lens elements (810-840) with refractive power.

The first lens element 810 with negative refractive power has an object-side surface 811 being convex in a paraxial region thereof and an image-side surface 812 being concave in a paraxial region thereof, which are both aspheric, and the first lens element 810 is made of plastic material.

The second lens element 820 with positive refractive power has an object-side surface 821 being convex in a paraxial region thereof and an image-side surface 822 being convex in a paraxial region thereof, which are both aspheric, and the second lens element 820 is made of plastic material.

The third lens element 830 with positive refractive power has an object-side surface 831 being convex in a paraxial region thereof and an image-side surface 832 being convex in a paraxial region thereof, which are both aspheric, and the third lens element 830 is made of plastic material. Moreover, a curvature of the image-side surface 832 of the third lens element 830 in an off-axis region thereof is smaller than a curvature of the image-side surface 832 of the third lens element 830 in the paraxial region.

The fourth lens element 840 with negative refractive power has an object-side surface 841 being concave in a paraxial region thereof and an image-side surface 842 being concave in a paraxial region thereof, which are both aspheric, and the fourth lens element 840 is made of plastic material. Furthermore, the image-side surface 842 of the fourth lens element 840 includes a convex portion in an off-axis region thereof.

The IR-cut filter 850 is made of glass and located between the fourth lens element 840 and the image plane 860, and will not affect the focal length of the optical photographing lens assembly. The image sensor 870 is disposed on or near the image plane 860 of the optical photographing lens assembly.

The detailed optical data of the 8th embodiment are shown in Table 15 and the aspheric surface data are shown in Table 16 below.

TABLE 15

8th Embodiment
f = 1.39 mm, Fno = 2.65, HFOV = 52.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.762 | ASP | 0.300 | Plastic | 1.634 | 23.8 | −2.15 |
| 2 | | 0.717 | ASP | 0.845 | | | | |
| 3 | Ape. Stop | Plano | | 0.081 | | | | |
| 4 | Lens 2 | 4.709 | ASP | 0.733 | Plastic | 1.544 | 55.9 | 1.50 |
| 5 | | −0.932 | ASP | 0.070 | | | | |
| 6 | Lens 3 | 7.412 | ASP | 0.656 | Plastic | 1.544 | 55.9 | 0.89 |
| 7 | | −0.500 | ASP | 0.040 | | | | |
| 8 | Lens 4 | −0.563 | ASP | 0.250 | Plastic | 1.634 | 23.8 | −0.88 |
| 9 | | 100.000 | ASP | 0.500 | | | | |
| 10 | IR-cut filter | Plano | | 0.300 | Glass | 1.517 | 64.2 | — |
| 11 | | Plano | | 0.696 | | | | |
| 12 | Image | Plano | | — | | | | |

Note:
Reference wavelength is 587.6 nm (d-line).

TABLE 16

| Aspheric Coefficients | | | | |
|---|---|---|---|---|
| Surface # | 1 | 2 | 4 | 5 |
| k = | 2.8491E−01 | −2.6796E+00 | −7.3234E+01 | −3.4659E−01 |
| A4 = | 8.9482E−01 | 2.7286E+00 | 9.0878E−02 | 3.8477E−01 |
| A6 = | −1.7298E+00 | −2.0392E+00 | −1.8727E+00 | −1.2862E+00 |
| A8 = | 3.4292E+00 | 4.4126E+00 | 2.4158E+01 | 1.9962E+00 |
| A10 = | −3.8627E+00 | 2.9041E+01 | −1.8691E+02 | −3.4605E+00 |
| A12 = | 1.4880E+00 | −6.6571E+01 | 6.2334E+02 | 3.9044E+00 |
| A14 = | | | −7.0874E+02 | −1.7012E+00 |

| Surface # | 6 | 7 | 8 | 9 |
|---|---|---|---|---|
| k = | −3.3332E+00 | −3.0131E+00 | −2.8568E+00 | −2.5236E+00 |
| A4 = | 2.1416E−01 | 3.1968E−01 | 1.5916E+00 | 9.4693E−01 |
| A6 = | −3.5268E−01 | −2.3389E+00 | −9.4809E+00 | −4.2405E+00 |
| A8 = | −1.1955E+00 | 5.2797E+00 | 2.3718E+01 | 1.0021E+01 |
| A10 = | 2.1516E+00 | −5.6892E+00 | −2.7486E+01 | −1.3775E+01 |
| A12 = | −9.1187E−01 | 2.9616E+00 | 1.1376E+01 | 1.1082E+01 |
| A14 = | 2.5721E−01 | −1.1138E−01 | 4.5134E+00 | −4.8026E+00 |
| A16 = | | | −4.0926E+00 | 8.5274E−01 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 1.39 | (R5 + R6)/(R5 − R6) | 0.87 |
| Fno | 2.65 | (R7 + R8)/(R7 − R8) | −0.99 |
| HFOV [deg.] | 52.5 | (R6 + R7)/((R6 − R7)*100) | −0.17 |
| V1 | 23.8 | f2/f1 | −0.70 |
| V1/V4 | 1.00 | f4/f1 | 0.41 |
| CT2/(CT3 + CT4) | 0.81 | SD/TD | 0.62 |
| (T23 + T34)/T12 | 0.12 | SAG11/CT1 | 1.60 |
| T34/T23 | 0.57 | N1 + N2 + N3 + N4 | 6.36 |
| (R3 + R4)/(R3 − R4) | 0.67 | TL/ImgH | 3.00 |

9th Embodiment

Figure 9A:
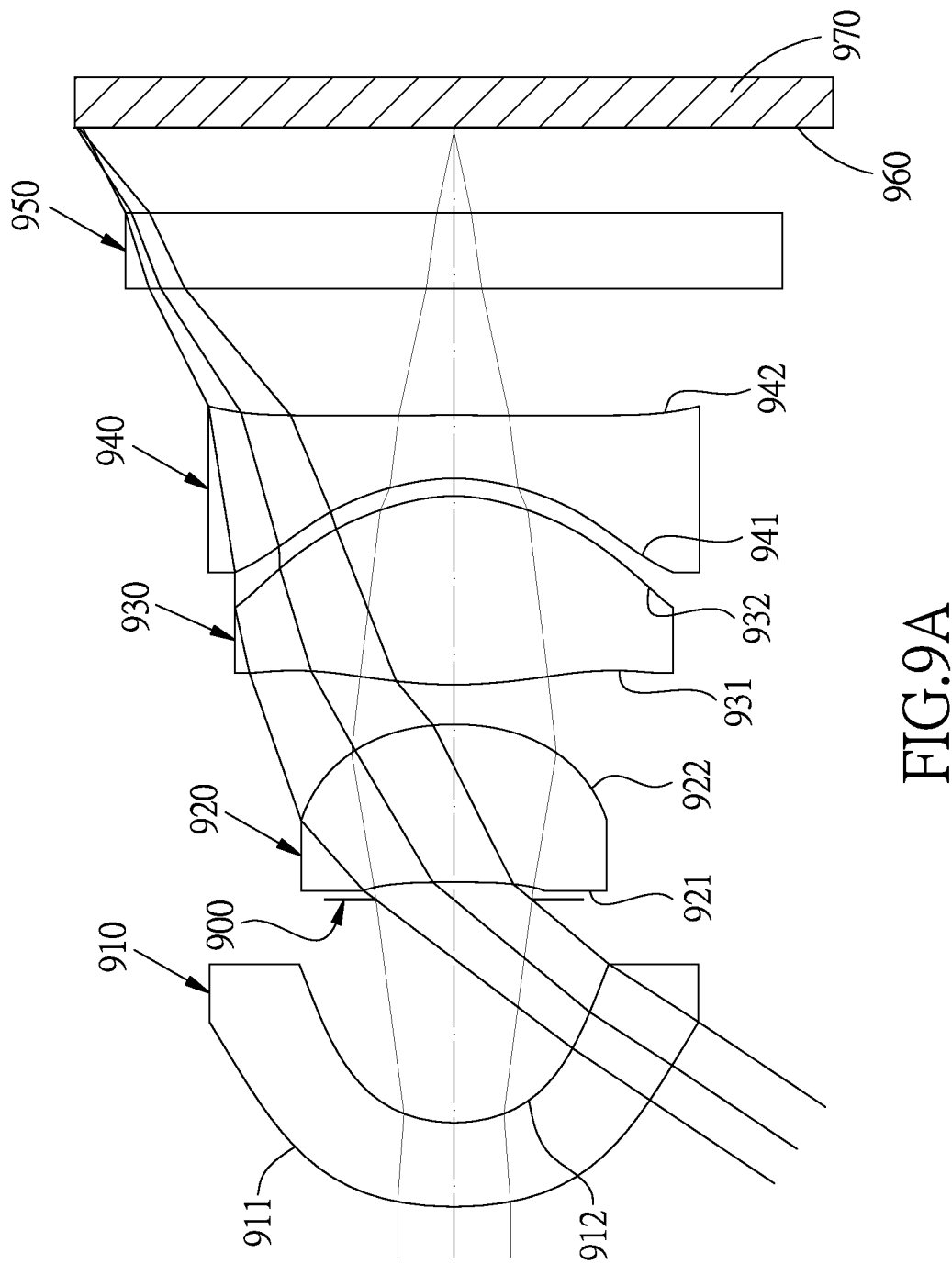
FIG. 9A is a schematic view of an imaging unit according to the 9th embodiment of the present disclosure.
Figure 9B:
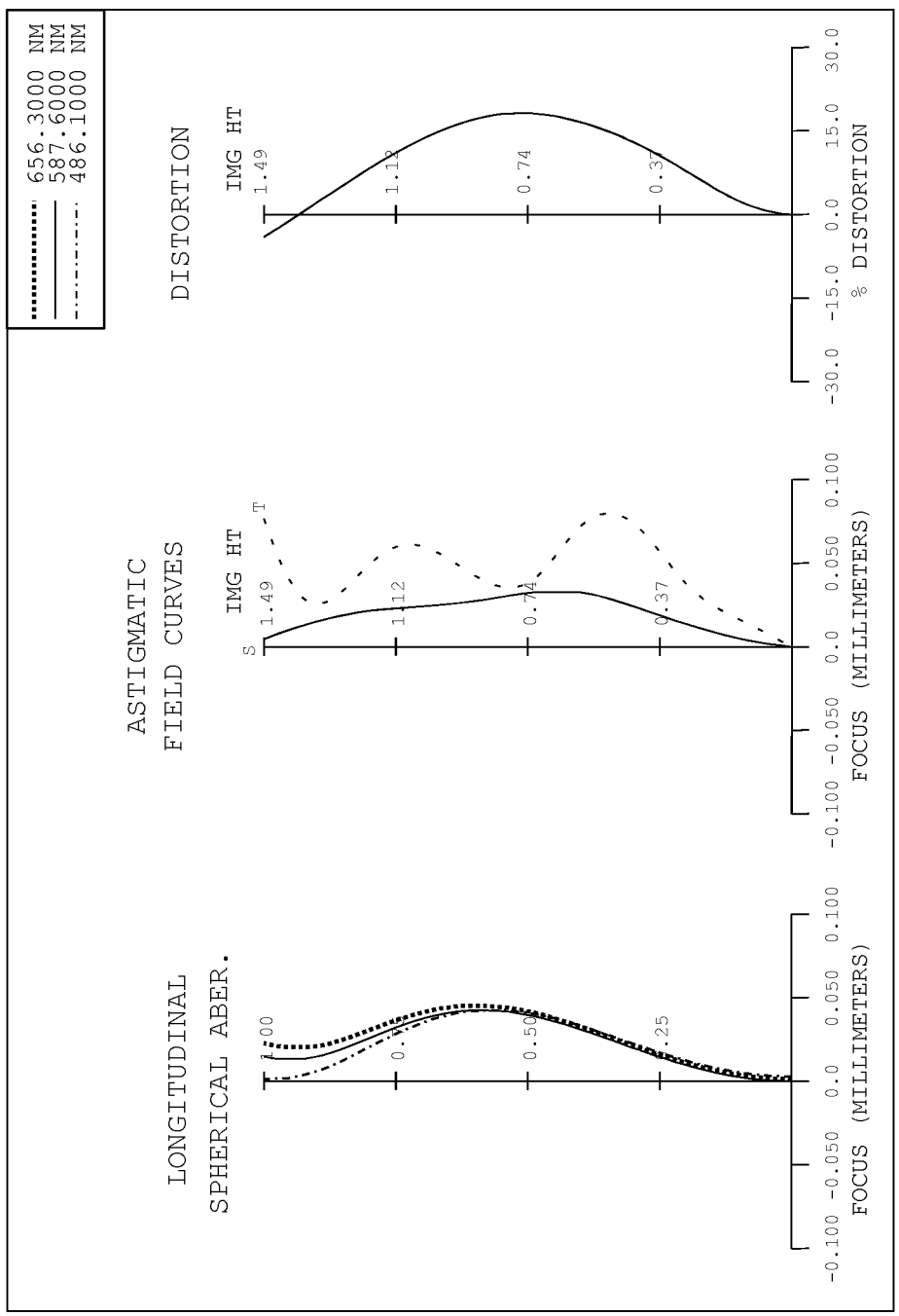
FIG. 9B shows spherical aberration curves, astigmatic field curves and a distortion curve of the imaging unit according to the 9th embodiment.

FIG. 9A is a schematic view of an imaging unit according to the 9th embodiment of the present disclosure. FIG. 9B shows, in order from left to right, spherical aberration curves, astigmatic field curves and a distortion curve of the imaging unit according to the 9th embodiment.

In FIG. 9A, the imaging unit includes the optical photographing lens assembly (not otherwise herein labeled) of the present disclosure and an image sensor 970. The optical photographing lens assembly includes, in order from an object side to an image side, a first lens element 910, an aperture stop 900, a second lens element 920, a third lens element 930, a fourth lens element 940, an IR-cut filter 950 and an image plane 960, wherein the optical photographing lens assembly has a total of four non-cemented lens elements (910-940) with refractive power.

The first lens element 910 with negative refractive power has an object-side surface 911 being convex in a paraxial region thereof and an image-side surface 912 being concave in a paraxial region thereof, which are both aspheric, and the first lens element 910 is made of glass material.

The second lens element 920 with positive refractive power has an object-side surface 921 being concave in a paraxial region thereof and an image-side surface 922 being convex in a paraxial region thereof, which are both aspheric, and the second lens element 920 is made of plastic material.

The third lens element 930 with positive refractive power has an object-side surface 931 being convex in a paraxial region thereof and an image-side surface 932 being convex in a paraxial region thereof, which are both aspheric, and the third lens element 930 is made of plastic material. Moreover, a curvature of the image-side surface 932 of the third lens element 930 in an off-axis region thereof is smaller than a curvature of the image-side surface 932 of the third lens element 930 in the paraxial region.

The fourth lens element 940 with negative refractive power has an object-side surface 941 being concave in a paraxial region thereof and an image-side surface 942 being convex in a paraxial region thereof, which are both aspheric, and the fourth lens element 940 is made of plastic material. Furthermore, the image-side surface 942 of the fourth lens element 940 includes a concave portion in an off-axis region thereof.

The IR-cut filter 950 is made of glass and located between the fourth lens element 940 and the image plane 960, and will not affect the focal length of the optical photographing lens assembly. The image sensor 970 is disposed on or near the image plane 960 of the optical photographing lens assembly.

The detailed optical data of the 9th embodiment are shown in Table 17 and the aspheric surface data are shown in Table 18 below.

TABLE 17

9th Embodiment
f = 1.03 mm, Fno = 2.30, HFOV = 56.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.482 ASP | 0.332 | Glass | 1.648 | 33.8 | −1.92 |

TABLE 17-continued

9th Embodiment
f = 1.03 mm, Fno = 2.30, HFOV = 56.2 deg.

| Surface # | | Curvature Radius | | Thickness | Material | Index | Abbe # | Focal Length |
|---|---|---|---|---|---|---|---|---|
| 2 | | 0.617 | ASP | 0.880 | | | | |
| 3 | Ape. Stop | Plano | | 0.070 | | | | |
| 4 | Lens 2 | −5.424 | ASP | 0.623 | Plastic | 1.544 | 55.9 | 2.01 |
| 5 | | −0.948 | ASP | 0.157 | | | | |
| 6 | Lens 3 | 1.733 | ASP | 0.745 | Plastic | 1.544 | 55.9 | 0.99 |
| 7 | | −0.665 | ASP | 0.070 | | | | |
| 8 | Lens 4 | −0.754 | ASP | 0.250 | Plastic | 1.650 | 21.4 | −1.36 |
| 9 | | −5.816 | ASP | 0.500 | | | | |
| 10 | IR-cut filter | Plano | | 0.300 | Glass | 1.517 | 64.2 | — |
| 11 | | Plano | | 0.335 | | | | |
| 12 | Image | Plano | | — | | | | |

Note:
Reference wavelength is 587.6 nm (d-line).

TABLE 18

Aspheric Coefficients

| Surface # | 1 | 2 | 4 | 5 |
|---|---|---|---|---|
| k = | −1.7503E−01 | −2.2638E+00 | 8.9803E+01 | 1.3507E+00 |
| A4 = | 9.4186E−01 | 2.7597E+00 | −8.2240E−01 | −4.6896E−01 |
| A6 = | −1.7166E+00 | 1.9432E−01 | −1.7141E+00 | −7.6370E−01 |
| A8 = | 3.7214E+00 | 1.2551E+00 | 1.9018E+01 | 4.2552E+00 |
| A10 = | −4.0237E+00 | 1.9737E+01 | −3.3733E+02 | −7.5391E+00 |
| A12 = | 1.4880E+00 | −6.5572E+01 | 6.2334E+02 | 3.9044E+00 |
| A14 = | | | −7.0874E+02 | −1.7012E+00 |

| Surface # | 6 | 7 | 8 | 9 |
|---|---|---|---|---|
| k = | −2.0626E+01 | −4.9162E+00 | −1.4826E+00 | 5.8587E+00 |
| A4 = | −4.9623E−03 | 7.9886E−02 | 1.5671E+00 | 9.0905E−01 |
| A6 = | −2.9916E−01 | −2.3602E+00 | −9.5578E+00 | −4.1323E+00 |
| A8 = | −6.9821E−01 | 5.4125E+00 | 2.3797E+01 | 1.0011E+01 |
| A10 = | 1.7066E+00 | −5.9650E+00 | −2.7522E+01 | −1.3785E+01 |
| A12 = | −9.1187E−01 | 2.9616E+00 | 1.1376E+01 | 1.1082E+01 |
| A14 = | 2.5721E−01 | −1.1138E−01 | 4.5134E+00 | −4.8026E+00 |
| A16 = | | | −4.0926E+00 | 8.5274E−01 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 1.03 | (R5 + R6)/(R5 − R6) | 0.45 |
| Fno | 2.30 | (R7 + R8)/(R7 − R8) | −1.30 |
| HFOV [deg.] | 56.2 | (R6 + R7)/((R6 − R7)*100) | −0.16 |
| V1 | 33.8 | f2/f1 | −1.05 |
| V1/V4 | 1.58 | f4/f1 | 0.71 |
| CT2/(CT3 + CT4) | 0.63 | SD/TD | 0.61 |
| (T23 + T34)/T12 | 0.24 | SAG11/CT1 | 2.20 |
| T34/T23 | 0.45 | N1 + N2 + N3 + N4 | 6.39 |
| (R3 + R4)/(R3 − R4) | 1.42 | TL/ImgH | 2.86 |

10th Embodiment

Figure 10A:
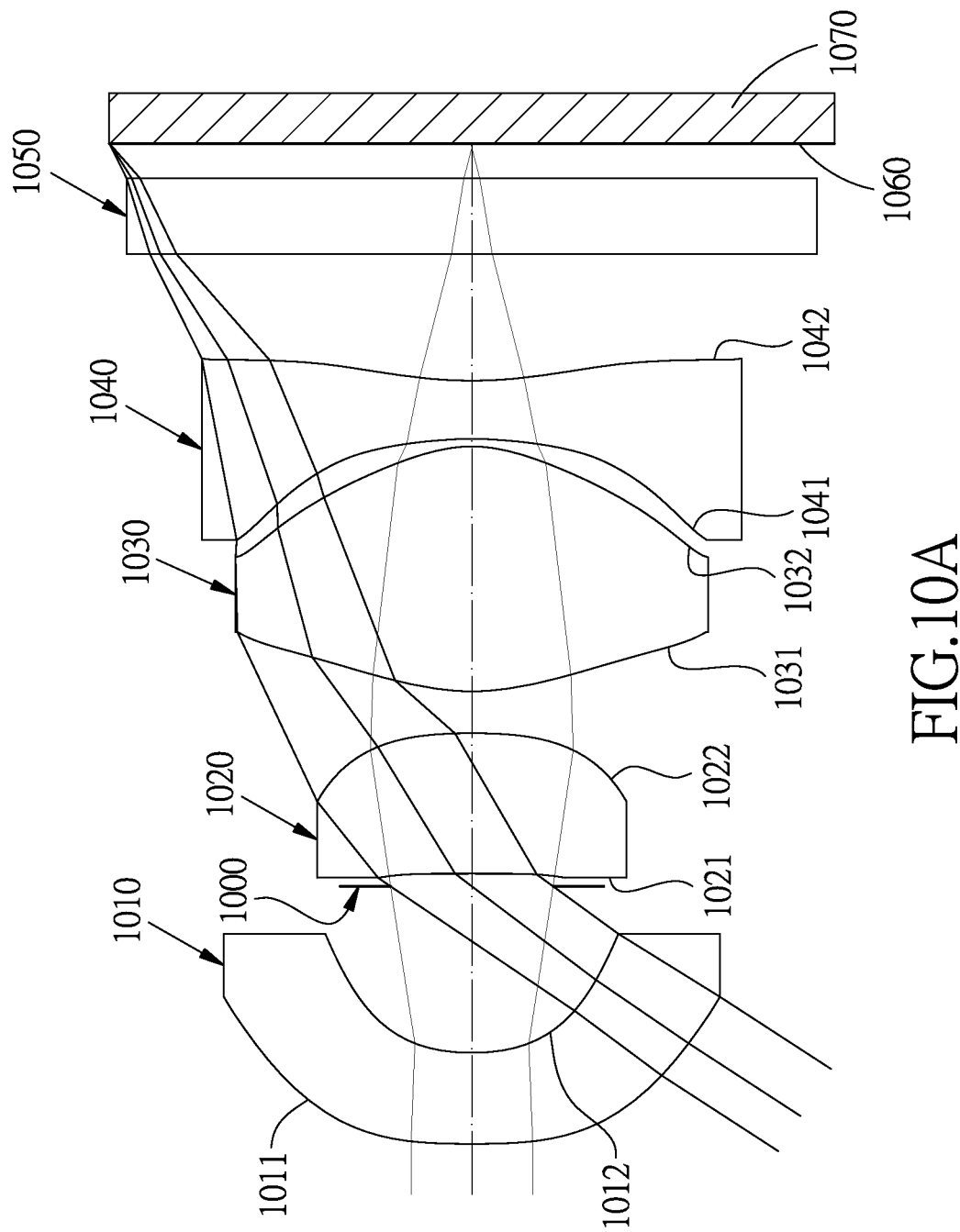
FIG. 10A is a schematic view of an imaging unit according to the 10th embodiment of the present disclosure.
Figure 10B:
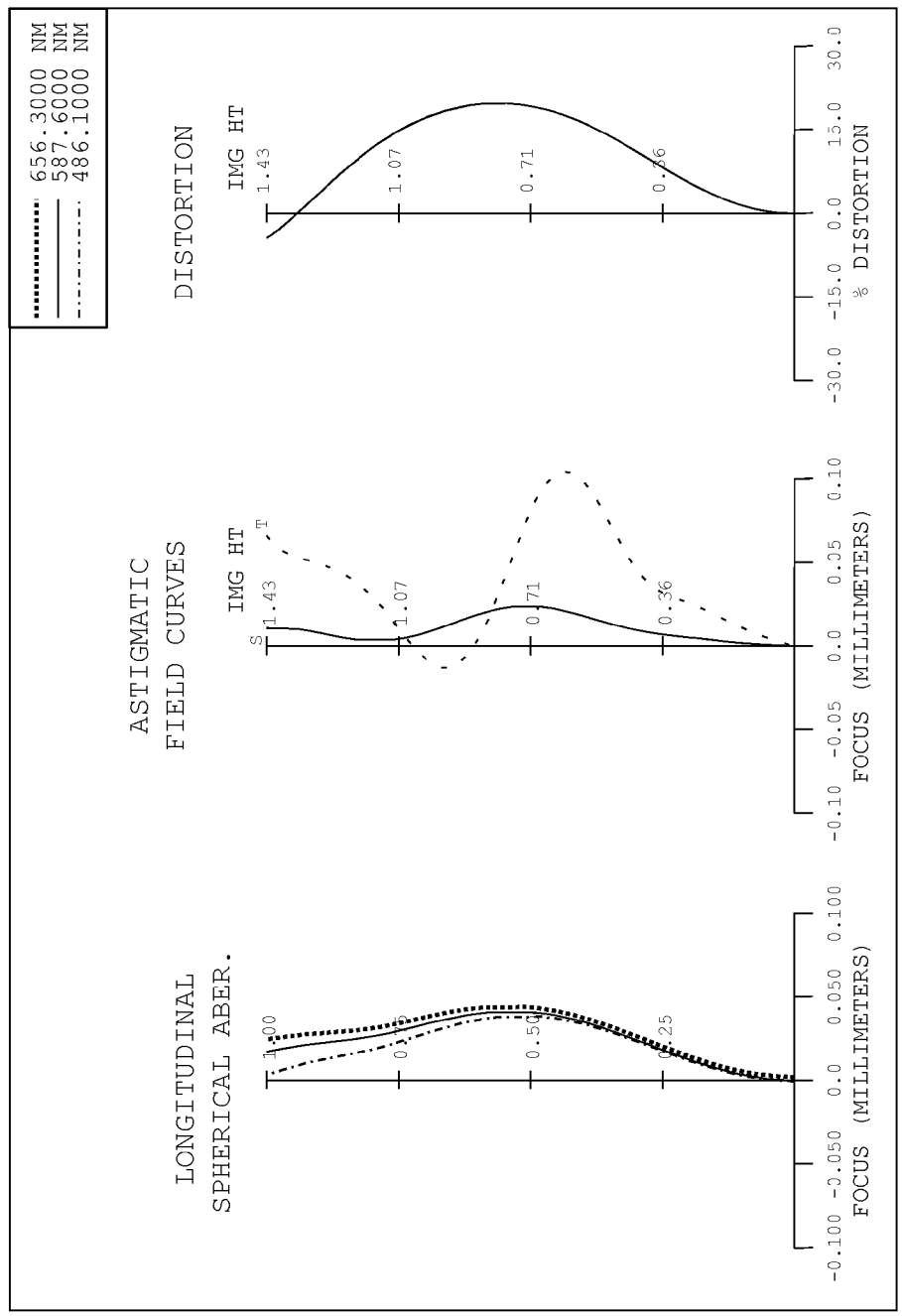
FIG. 10B shows spherical aberration curves, astigmatic field curves and a distortion curve of the imaging unit according to the 10th embodiment.

FIG. 10A is a schematic view of an imaging unit according to the 10th embodiment of the present disclosure. FIG. 10B shows, in order from left to right, spherical aberration curves, astigmatic field curves and a distortion curve of the imaging unit according to the 10th embodiment.

In FIG. 10A, the imaging unit includes the optical photographing lens assembly (not otherwise herein labeled) of the present disclosure and an image sensor 1070. The optical photographing lens assembly includes, in order from an object side to an image side, a first lens element 1010, an aperture stop 1000, a second lens element 1020, a third lens element 1030, a fourth lens element 1040, an IR-cut filter 1050 and an image plane 1060, wherein the optical photographing lens assembly has a total of four non-cemented lens elements (1010-1040) with refractive power.

The first lens element 1010 with negative refractive power has an object-side surface 1011 being convex in a paraxial region thereof and an image-side surface 1012 being concave in a paraxial region thereof, which are both aspheric, and the first lens element 1010 is made of plastic material.

The second lens element 1020 with positive refractive power has an object-side surface 1021 being convex in a paraxial region thereof and an image-side surface 1022 being convex in a paraxial region thereof, which are both aspheric, and the second lens element 1020 is made of plastic material.

The third lens element 1030 with positive refractive power has an object-side surface 1031 being convex in a paraxial region thereof and an image-side surface 1032 being convex in a paraxial region thereof, which are both aspheric, and the third lens element 1030 is made of plastic material. Moreover, a curvature of the image-side surface 1032 of the third lens element 1030 in an off-axis region thereof is smaller than a curvature of the image-side surface 1032 of the third lens element 1030 in the paraxial region.

The fourth lens element 1040 with negative refractive power has an object-side surface 1041 being concave in a paraxial region thereof and an image-side surface 1042 being concave in a paraxial region thereof, which are both aspheric, and the fourth lens element 1040 is made of plastic material. Furthermore, the image-side surface 1042 of the fourth lens element 1040 includes a convex portion in an off-axis region thereof.

The IR-cut filter 1050 is made of glass and located between the fourth lens element 1040 and the image plane 1060, and will not affect the focal length of the optical photographing lens assembly. The image sensor 1070 is disposed on or near the image plane 1060 of the optical photographing lens assembly.

The detailed optical data of the 10th embodiment are shown in Table 19 and the aspheric surface data are shown in Table 20 below.

TABLE 19

10th Embodiment
f = 0.96 mm, Fno = 2.00, HFOV = 57.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.229 | ASP | 0.360 | Plastic | 1.535 | 55.7 | −1.99 |
| 2 | | 0.864 | ASP | 0.658 | | | | |
| 3 | Ape. Stop | Plano | | 0.050 | | | | |
| 4 | Lens 2 | 128.501 | ASP | 0.555 | Plastic | 1.535 | 55.7 | 4.32 |
| 5 | | −2.350 | ASP | 0.166 | | | | |
| 6 | Lens 3 | 0.945 | ASP | 0.968 | Plastic | 1.544 | 55.9 | 0.81 |
| 7 | | −0.530 | ASP | 0.030 | | | | |
| 8 | Lens 4 | −1.339 | ASP | 0.230 | Plastic | 1.650 | 21.4 | −1.15 |
| 9 | | 1.815 | ASP | 0.500 | | | | |
| 10 | IR-cut filter | Plano | | 0.300 | Glass | 1.517 | 64.2 | — |
| 11 | | Plano | | 0.137 | | | | |
| 12 | Image | Plano | | — | | | | |

Note:
Reference wavelength is 587.6 nm (d-line).

TABLE 20

Aspheric Coefficients

| Surface # | 1 | 2 | 4 | 5 |
|---|---|---|---|---|
| k = | 3.5404E+00 | −4.5008E−01 | 9.0000E+01 | 5.9716E+00 |
| A4 = | 1.4191E+00 | 3.0543E+00 | −1.0233E+00 | −1.2944E+00 |
| A6 = | −2.9536E+00 | −4.4701E+00 | 7.5416E+00 | 2.9471E−01 |
| A8 = | 4.8713E+00 | 2.7637E−01 | −7.3017E+01 | 3.4244E+00 |
| A10 = | −4.3050E+00 | 6.5816E+01 | 1.0312E+02 | −1.2323E+01 |
| A12 = | 1.4880E+00 | −1.3649E+02 | 6.2334E+02 | 3.9044E+00 |
| A14 = | | | −7.0874E+02 | −1.7012E+00 |

| Surface # | 6 | 7 | 8 | 9 |
|---|---|---|---|---|
| k = | −7.9977E+00 | −4.0118E+00 | −5.0552E−01 | −4.8328E+01 |
| A4 = | 4.3270E−02 | 4.3414E−01 | 1.5736E+00 | 7.6222E−01 |
| A6 = | −1.2906E−01 | −2.4343E+00 | −9.6931E+00 | −4.1820E+00 |
| A8 = | −4.8833E−01 | 5.2589E+00 | 2.3590E+01 | 1.0058E+01 |
| A10 = | 1.2577E+00 | −6.0785E+00 | −2.7814E+01 | −1.3757E+01 |
| A12 = | −9.1187E−01 | 2.9616E+00 | 1.1409E+01 | 1.1016E+01 |
| A14 = | 2.5721E−01 | −1.1138E+00 | 4.9209E+00 | −4.8401E+00 |
| A16 = | | | −4.0189E+00 | 9.1212E−01 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 0.96 | (R5 + R6)/(R5 − R6) | 0.28 |
| Fno | 2.00 | (R7 + R8)/(R7 − R8) | −0.15 |
| HFOV [deg.] | 57.0 | (R6 + R7)/((R6 − R7)*100) | −0.02 |
| V1 | 55.7 | f2/f1 | −2.17 |
| V1/V4 | 2.60 | f4/f1 | 0.58 |
| CT2/(CT3 + CT4) | 0.46 | SD/TD | 0.66 |
| (T23 + T34)/T12 | 0.28 | SAG11/CT1 | 1.61 |
| T34/T23 | 0.18 | N1 + N2 + N3 + N4 | 6.26 |
| (R3 + R4)/(R3 − R4) | 0.96 | TL/ImgH | 2.77 |

11th Embodiment

Figure 11A:
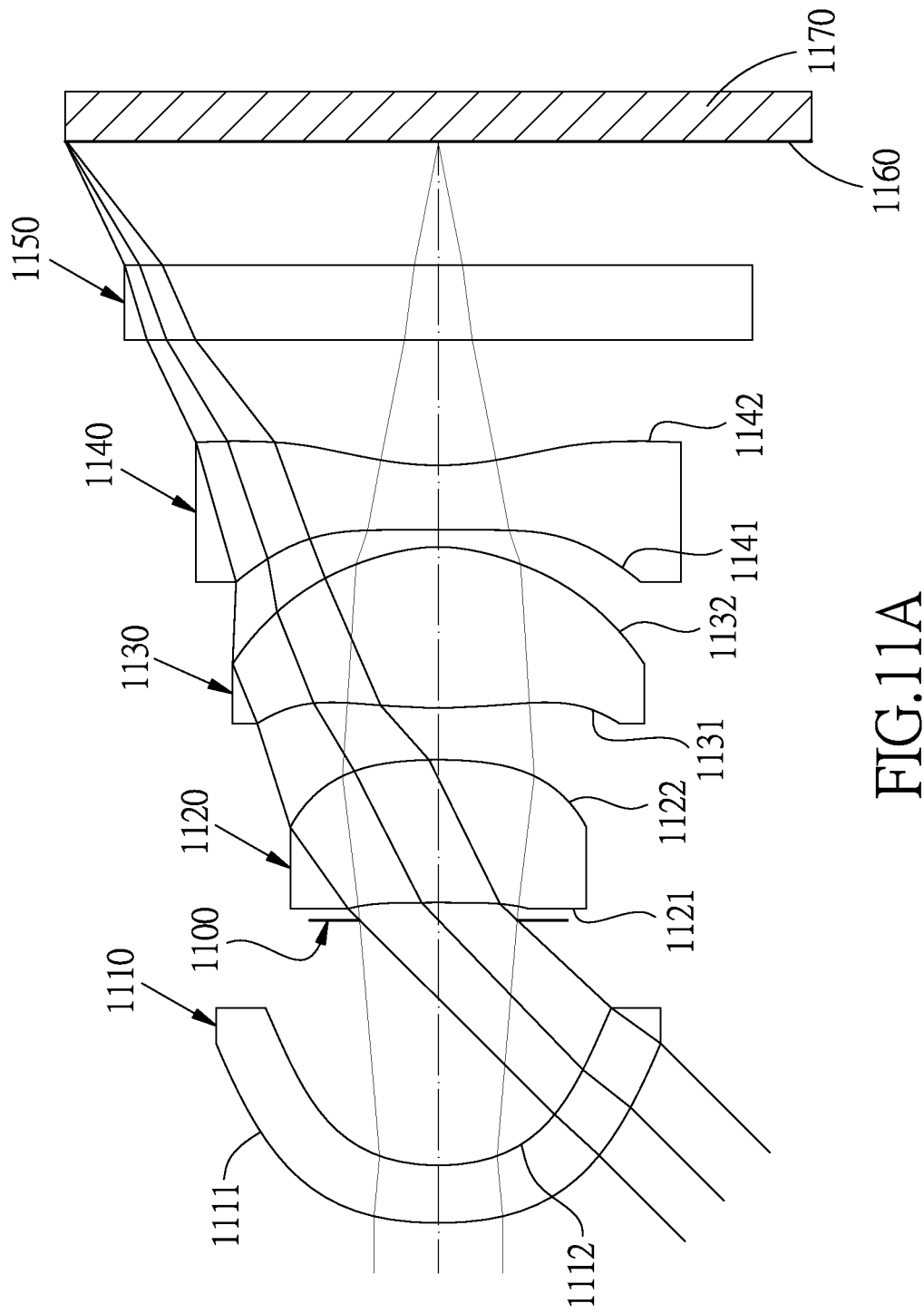
FIG. 11A is a schematic view of an imaging unit according to the 11th embodiment of the present disclosure.
Figure 11B:
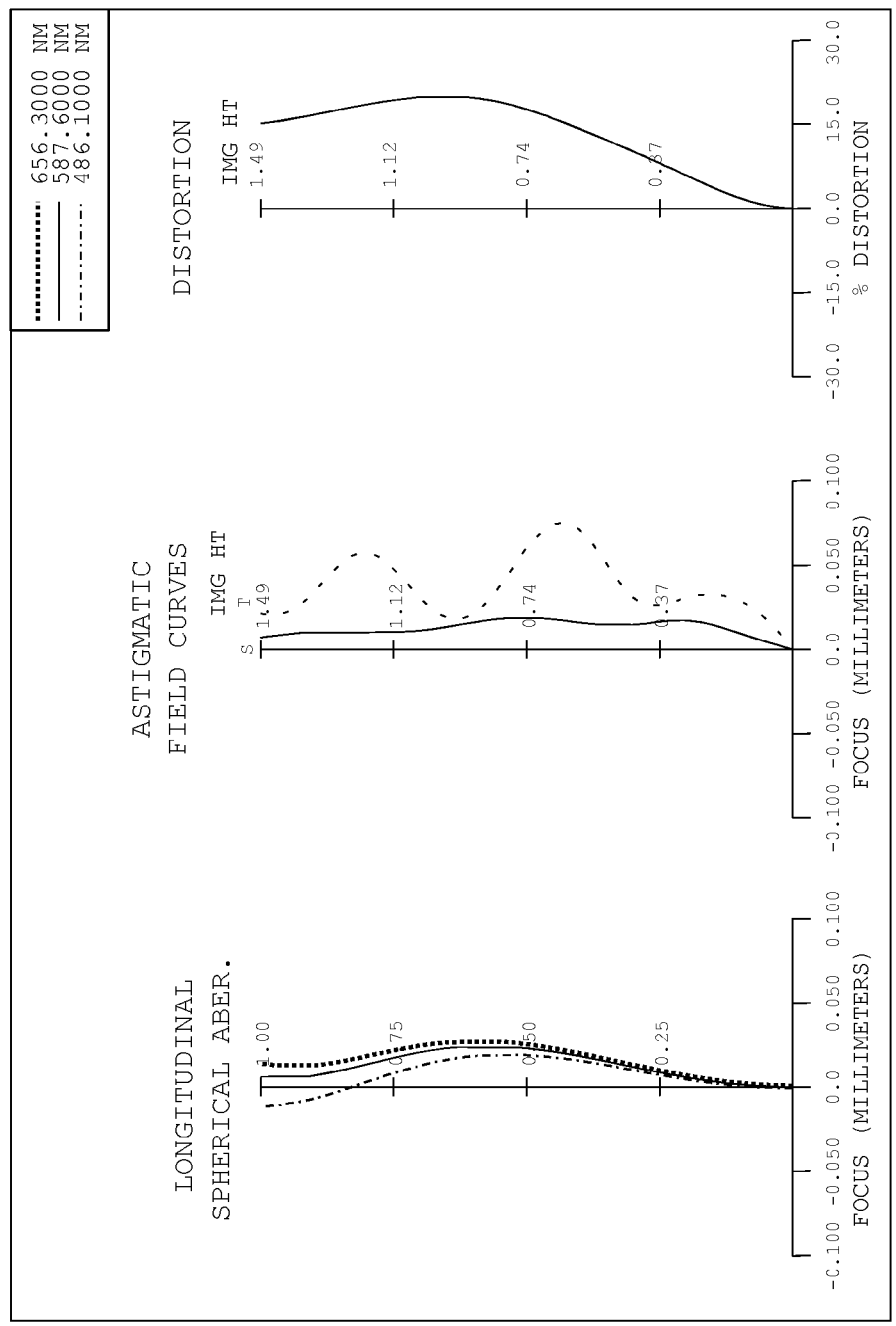
FIG. 11B shows spherical aberration curves, astigmatic field curves and a distortion curve of the imaging unit according to the 11th embodiment.

FIG. 11A is a schematic view of an imaging unit according to the 11th embodiment of the present disclosure. FIG. 11B shows, in order from left to right, spherical aberration curves, astigmatic field curves and a distortion curve of the imaging unit according to the 11th embodiment.

In FIG. 11A, the imaging unit includes the optical photographing lens assembly (not otherwise herein labeled) of the present disclosure and an image sensor 1170. The optical photographing lens assembly includes, in order from an object side to an image side, a first lens element 1110, an aperture stop 1100, a second lens element 1120, a third lens element 1130, a fourth lens element 1140, an IR-cut filter 1150 and an image plane 1160, wherein the optical photographing lens assembly has a total of four non-cemented lens elements (1110-1140) with refractive power.

The first lens element 1110 with negative refractive power has an object-side surface 1111 being convex in a paraxial region thereof and an image-side surface 1112 being concave in a paraxial region thereof, which are both aspheric, and the first lens element 1110 is made of glass material.

The second lens element 1120 with positive refractive power has an object-side surface 1121 being concave in a paraxial region thereof and an image-side surface 1122 being convex in a paraxial region thereof, which are both aspheric, and the second lens element 1120 is made of plastic material.

The third lens element 1130 with positive refractive power has an object-side surface 1131 being convex in a paraxial region thereof and an image-side surface 1132 being convex in a paraxial region thereof, which are both aspheric, and the third lens element 1130 is made of plastic material. Moreover, a curvature of the image-side surface 1132 of the third lens element 1130 in an off-axis region thereof is smaller than a curvature of the image-side surface 1132 of the third lens element 1130 in the paraxial region.

The fourth lens element 1140 with negative refractive power has an object-side surface 1141 being concave in a paraxial region thereof and an image-side surface 1142 being concave in a paraxial region thereof, which are both aspheric, and the fourth lens element 1140 is made of plastic material. Furthermore, the image-side surface 1142 of the fourth lens element 1140 includes a convex portion in an off-axis region thereof.

The IR-cut filter 1150 is made of glass and located between the fourth lens element 1140 and the image plane 1160, and will not affect the focal length of the optical photographing lens assembly. The image sensor 1170 is disposed on or near the image plane 1160 of the optical photographing lens assembly.

The detailed optical data of the 11th embodiment are shown in Table 21 and the aspheric surface data are shown in Table 22 below.

TABLE 21

11th Embodiment
f = 1.29 mm, Fno = 2.50, HFOV = 45.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.489 | ASP | 0.230 | Glass | 1.667 | 33.0 | −3.38 |
| 2 | | 0.841 | ASP | 0.981 | | | | |
| 3 | Ape. Stop | Plano | | 0.070 | | | | |
| 4 | Lens 2 | −14.867 | ASP | 0.571 | Plastic | 1.535 | 55.7 | 3.71 |
| 5 | | −1.774 | ASP | 0.208 | | | | |
| 6 | Lens 3 | 2.467 | ASP | 0.643 | Plastic | 1.535 | 55.7 | 1.03 |
| 7 | | −0.647 | ASP | 0.070 | | | | |
| 8 | Lens 4 | −5.573 | ASP | 0.257 | Plastic | 1.639 | 23.5 | −1.59 |
| 9 | | 1.269 | ASP | 0.500 | | | | |
| 10 | IR-cut filter | Plano | | 0.300 | Glass | 1.517 | 64.2 | — |
| 11 | | Plano | | 0.494 | | | | |
| 12 | Image | Plano | | — | | | | |

Note:
Reference wavelength is 587.6 nm (d-line).

TABLE 22

| Aspheric Coefficients | | | | |
|---|---|---|---|---|
| Surface # | 1 | 2 | 4 | 5 |
| k = | 3.7986E−02 | −1.5987E+00 | 9.0000E+01 | 7.0162E+00 |
| A4 = | 9.4314E−01 | 1.6429E+00 | −7.2990E−01 | −7.2315E−01 |
| A6 = | −1.3994E+00 | −1.9602E−01 | −3.8180E+00 | −1.7864E+00 |

TABLE 22-continued

| Aspheric Coefficients | | | | |
|---|---|---|---|---|
| A8 = | 3.4550E+00 | 4.4986E+00 | 2.9683E+01 | 6.2935E+00 |
| A10 = | −3.8413E+00 | −7.6489E+00 | −2.9404E+02 | −1.0942E+01 |
| A12 = | 1.4880E+00 | −2.3286E+00 | 6.2334E+02 | 3.9044E+00 |
| A14 = | | | −7.0874E+02 | −1.7012E+00 |

| Surface # | 6 | 7 | 8 | 9 |
|---|---|---|---|---|
| k = | −2.5982E+01 | −6.4484E+00 | 3.9438E+01 | −1.0782E+01 |
| A4 = | −9.3657E−02 | −1.5255E−01 | 1.1767E+00 | 4.7639E−01 |
| A6 = | −1.2417E+00 | −1.9975E+00 | −9.6570E+00 | −3.8157E+00 |
| A8 = | 2.7546E−02 | 5.2011E+00 | 2.4038E+01 | 9.7803E+00 |
| A10 = | 2.0019E+00 | −6.2973E+00 | −2.7661E+01 | −1.3697E+01 |
| A12 = | −9.1187E−01 | 2.9616E+00 | 1.1376E+01 | 1.1082E+01 |
| A14 = | 2.5721E−01 | −1.1138E−01 | 4.5134E+00 | −4.8026E+00 |
| A16 = | | | −4.0926E+00 | 8.5274E−01 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 1.29 | (R5 + R6)/(R5 − R6) | 0.58 |
| Fno | 2.50 | (R7 + R8)/(R7 − R8) | 0.63 |
| HFOV [deg.] | 45.0 | (R6 + R7)/((R6 − R7)*100) | −0.01 |
| V1 | 33.0 | f2/f1 | −1.10 |
| V1/V4 | 1.40 | f4/f1 | 0.47 |
| CT2/(CT3 + CT4) | 0.63 | SD/TD | 0.60 |
| (T23 + T34)/T12 | 0.26 | SAG11/CT1 | 3.12 |
| T34/T23 | 0.34 | N1 + N2 + N3 + N4 | 6.38 |
| (R3 + R4)/(R3 − R4) | 1.27 | TL/ImgH | 2.90 |

12th Embodiment

FIG. 13 is a schematic view of an electronic device 10 according to the 12th embodiment of the present disclosure. The electronic device 10 of the 12th embodiment is a smart TV, wherein the electronic device 10 includes an imaging unit 11. The imaging unit 11 includes an optical photographing lens assembly (not otherwise herein labeled) according to the present disclosure and an image sensor (not otherwise herein labeled), wherein the image sensor is disposed on or near an image plane of the optical photographing lens assembly.

13th Embodiment

FIG. 14 is a schematic view of an electronic device 20 according the 13th embodiment of the present disclosure. The electronic device 20 of the 13th embodiment is a wireless monitoring device, wherein the electronic device 20 includes an imaging unit 11. The imaging unit 11 includes an optical photographing lens assembly (not otherwise herein labeled) according to the present disclosure and an image sensor (not otherwise herein labeled), wherein the image sensor disposed on or near an image plane of the optical photographing lens assembly.

14th Embodiment

FIG. 15 is a schematic view of an electronic device 30 according to the 14th embodiment of the present disclosure. The electronic device 30 of the 14th embodiment is a motion sensing input device, wherein the electronic device 30 includes an imaging unit 11. The imaging unit 11 includes an optical photographing lens assembly (not otherwise herein labeled) according to the present disclosure and an image sensor (not otherwise herein labeled), wherein the image sensor disposed on or near an image plane of the optical photographing lens assembly.

The foregoing description, for purpose of explanation, has been described with reference to specific embodiments. It is to be noted that TABLES 1-22 show different data of the different embodiments; however, the data of the different embodiments are obtained from experiments. The embodiments were chosen and described in order best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing lens assembly comprising, in order from an object side to an image side:
   a first lens element with negative refractive power having an image-side surface being concave in a paraxial region thereof;
   a second lens element with positive refractive power having an image-side surface being convex in a paraxial region thereof;
   a third lens element with positive refractive power having an image-side surface being convex in a paraxial region thereof, both of an object-side surface and the image-side surface of the third lens element being aspheric; and
   a fourth lens element having negative refractive power, both of an object-side surface and an image-side surface of the fourth lens element being aspheric;
   wherein the optical photographing lens assembly has a total of four lens elements with refractive power, the first through the fourth lens elements are non-cemented, the optical photographing lens assembly further comprises an aperture stop which is located between the first lens element and the second lens element, at least one of the third lens element and the fourth lens element of the optical photographing lens assembly has at least one inflection point, an axial distance between the first lens element and the second lens element is T12, an axial distance between the second lens element and the third lens element is T23, an axial distance between the third lens element and the fourth lens element is T34, a curvature radius of the object-side surface of the fourth lens element is R7, a curvature radius of the image-side surface of the fourth lens element is R8, an axial distance between an object-side surface of the first lens element and the image-side surface of the fourth lens element is TD, an axial distance between the aperture stop and the image-side surface of the fourth lens element is SD, an axial distance between the object-side surface of the first lens element and an image plane is TL, a maximum image height of the optical photographing lens assembly is ImgH, and the following conditions are satisfied:

$(T23+T34)/T12<0.70;$ $-1.6<(R7+R8)/(R7-R8)<0.8;$ $0.45<SD/TD<0.90;$ and $TL/ImgH<4.0.$ 2. The optical photographing lens assembly of claim 1, wherein the object-side surface of the fourth lens element is concave in a paraxial region thereof.

3. The optical photographing lens assembly of claim 2, wherein the first lens element has an object-side surface being convex in a paraxial region thereof.

4. The optical photographing lens assembly of claim 2, wherein the axial distance between the first lens element and the second lens element is T12, the axial distance between the second lens element and the third lens element is T23, the axial distance between the third lens element and the fourth lens element is T34, and the following condition is satisfied:

$(T23+T34)/T12<0.50.$

5. The optical photographing lens assembly of claim 1, wherein a curvature radius of the object-side surface of the second lens element is R3, a curvature radius of the image-side surface of the second lens element is R4, and the following condition is satisfied:

$0<(R3+R4)/(R3-R4)<2.0.$

6. The optical photographing lens assembly of claim 1, wherein a curvature radius of the object-side surface of the third lens element is R5, a curvature radius of the image-side surface of the third lens element is R6, and the following condition is satisfied:

$0<(R5+R6)/(R5-R6)<1.5.$

7. The optical photographing lens assembly of claim 1, wherein a curvature radius of the image-side surface of the third lens element is R6, the curvature radius of the object-side surface of the fourth lens element is R7, and the following condition is satisfied:

$-3.0<(R6+R7)/((R6-R7)*100)<2.0.$

8. The optical photographing lens assembly of claim 1, wherein a central thickness of the second lens element is CT2, a central thickness of the third lens element is CT3, a central thickness of the fourth lens element is CT4, and the following condition is satisfied:

$0<CT2/(CT3+CT4)<0.90.$

9. The optical photographing lens assembly of claim 1, wherein a distance projected on an optical axis from an axial vertex on the object-side surface of the first lens element to a maximum effective radius position on the object-side surface of the first lens element is SAG11, a central thickness of the first lens element is CT1, and the following condition is satisfied:

$1.0<SAG11/CT1<4.5.$

10. The optical photographing lens assembly of claim 1, wherein the axial distance between the second lens element and the third lens element is T23, the axial distance between the third lens element and the fourth lens element is T34, and the following condition is satisfied:

$0<T34/T23<0.7.$

11. The optical photographing lens assembly of claim 1, wherein a curvature of the image-side surface of the third lens element is smaller in an off-axis region than a curvature of the image-side surface of the third lens element in a paraxial region.

12. The optical photographing lens assembly of claim 1, wherein the image-side surface of the fourth lens element either comprises a concave portion in a paraxial region and a convex portion in an off-axis region or comprises a convex portion in a paraxial region and a concave portion in an off-axis region.

13. An imaging unit, comprising:
   the optical photographing lens assembly of claim 1; and
   an image sensor, wherein the image sensor is disposed on the image side of the optical photographing lens assembly.

14. An electronic device, comprising:
   the imaging unit of claim 13.

* * * * *